United States Patent
Brander

(10) Patent No.: US 9,473,534 B2
(45) Date of Patent: Oct. 18, 2016

(54) SYSTEM AND METHOD FOR SWITCHING BETWEEN MESSAGING SECURITY POLICIES

(71) Applicant: BlackBerry Limited, Waterloo (CA)

(72) Inventor: Ryan Conrad Brander, Beaverbank (CA)

(73) Assignee: BlackBerry Limited, Waterloo, Ontario (CA)

( * ) Notice: Subject to any disclaimer, the term of this patent is extended or adjusted under 35 U.S.C. 154(b) by 96 days.

(21) Appl. No.: 14/293,783

(22) Filed: Jun. 2, 2014

(65) Prior Publication Data

US 2015/0350250 A1    Dec. 3, 2015

(51) Int. Cl.
*H04L 29/06* (2006.01)
*H04L 12/58* (2006.01)
*H04W 12/02* (2009.01)
*H04W 12/04* (2009.01)

(52) U.S. Cl.
CPC ............ *H04L 63/20* (2013.01); *H04L 51/04* (2013.01); *H04L 51/046* (2013.01); *H04L 51/066* (2013.01); *H04L 63/0428* (2013.01); *H04L 63/0435* (2013.01); *H04L 63/061* (2013.01); *H04L 63/105* (2013.01); *H04L 63/205* (2013.01); *H04W 12/02* (2013.01); *H04W 12/04* (2013.01)

(58) Field of Classification Search
CPC ..... H04L 63/20; H04L 63/205; H04L 51/04; H04L 63/105; H04L 63/108; H04L 51/046; H04L 51/066; H04L 63/0428; H04L 63/0435; H04L 63/061; H04W 12/02; H04W 12/04
USPC ............................................. 726/1
See application file for complete search history.

(56) References Cited

U.S. PATENT DOCUMENTS

| | | | |
|---|---|---|---|
| 2008/0034224 A1* | 2/2008 | Ferren ............... | G06F 21/88 713/193 |
| 2011/0035591 A1* | 2/2011 | Dudziak ............. | H04L 63/045 713/168 |
| 2013/0019304 A1* | 1/2013 | Cai ..................... | H04M 1/66 726/16 |
| 2015/0271206 A1* | 9/2015 | Schultz ............... | H04L 63/20 726/3 |

* cited by examiner

*Primary Examiner* — Yogesh Paliwal
(74) *Attorney, Agent, or Firm* — Donna Flores; Fleit Gibbons Gutman Bongini & Bianco P.L.

(57) ABSTRACT

A system and method are provided for switching between messaging security policies. The method includes determining that a messaging security policy for the electronic device has been downgraded from a higher security level to a lower security level; and removing protected content on the electronic device that has been subjected to the higher security level. Removing protected content can include any one or more of removing access to at least one protected instant messaging group, removing at least one multiparticipant instant messaging conversation, and removing at least a portion of protected content from within a one-to-one conversation with an instant messaging contact.

18 Claims, 19 Drawing Sheets

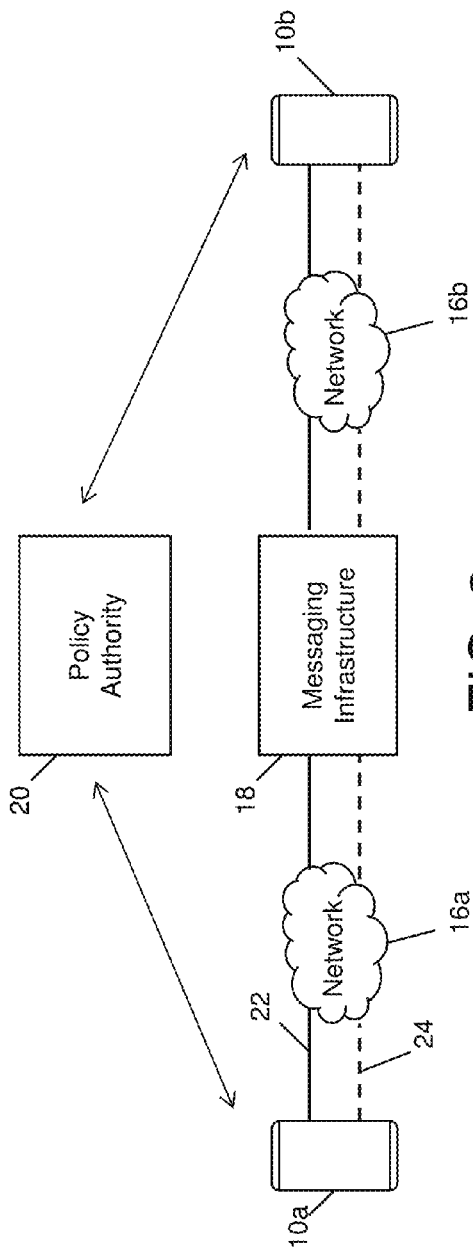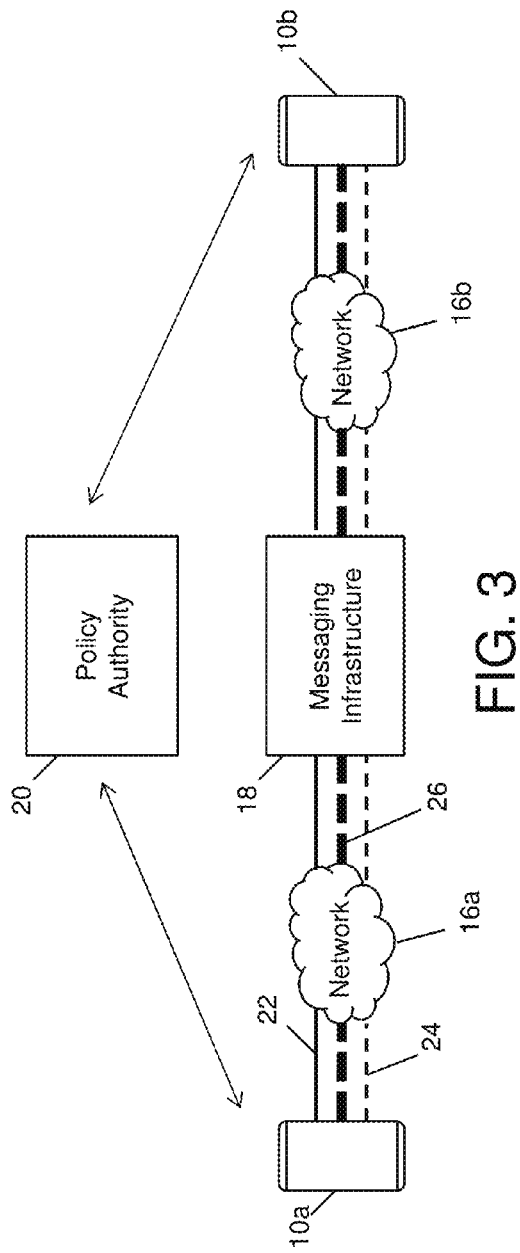

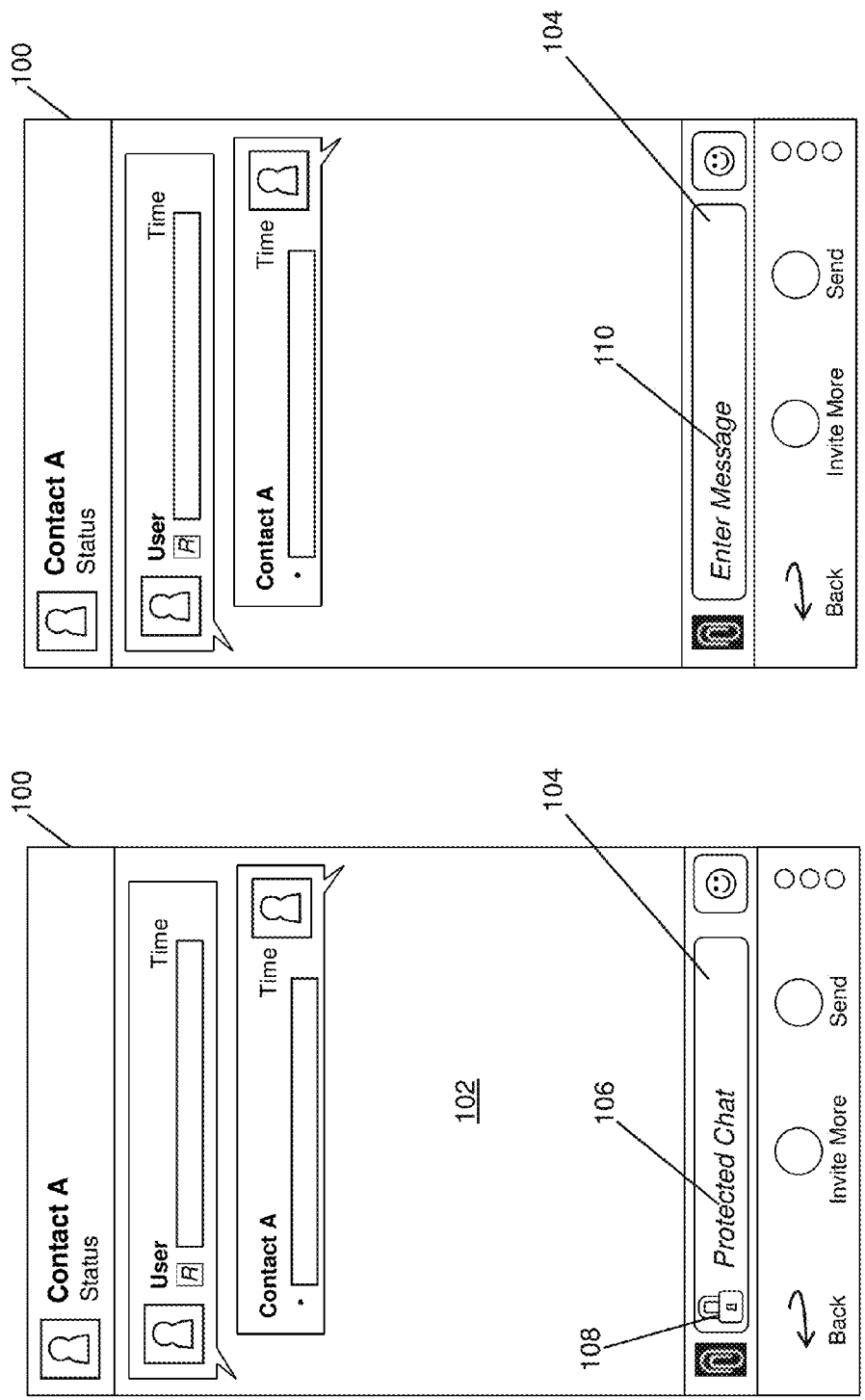

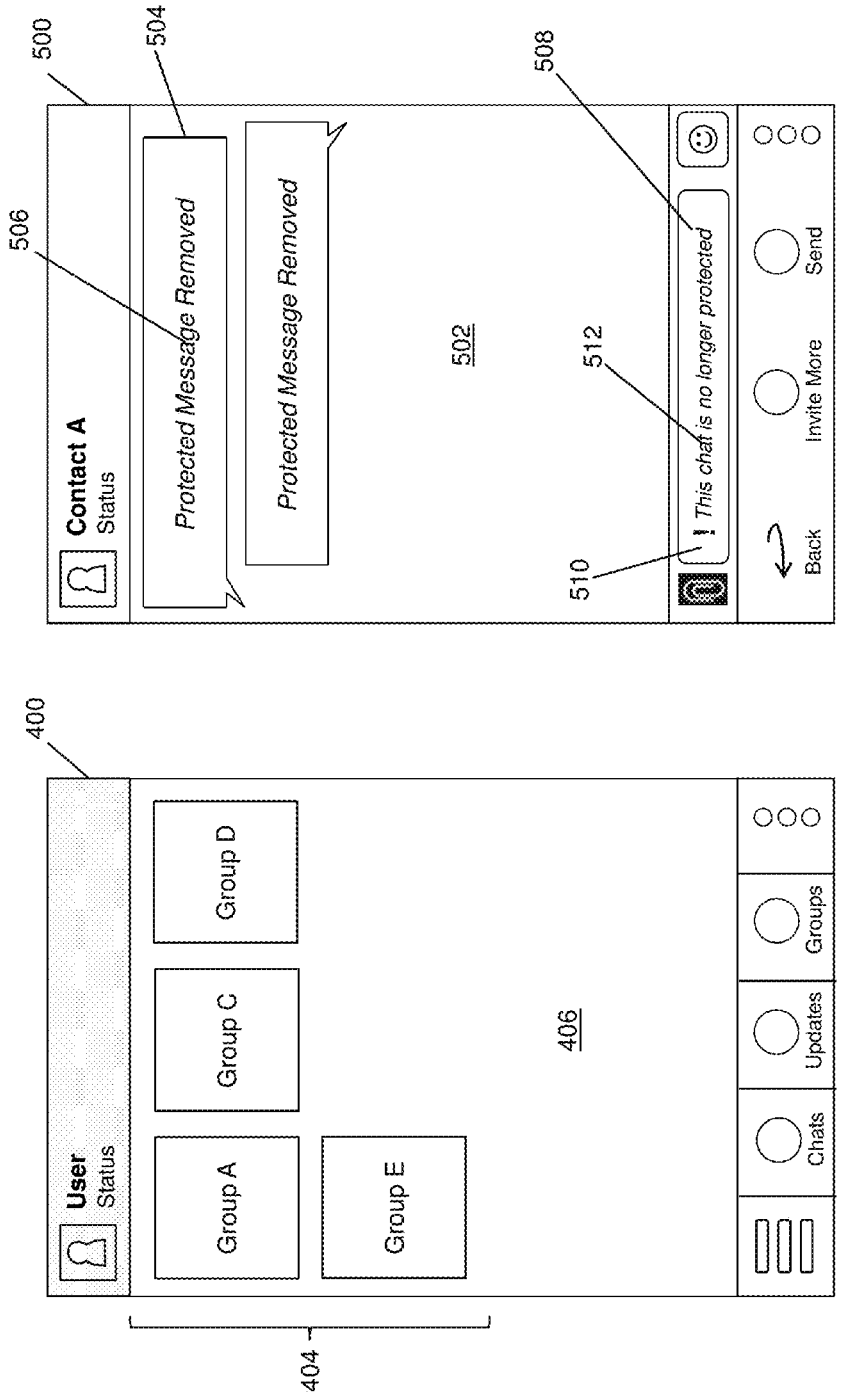

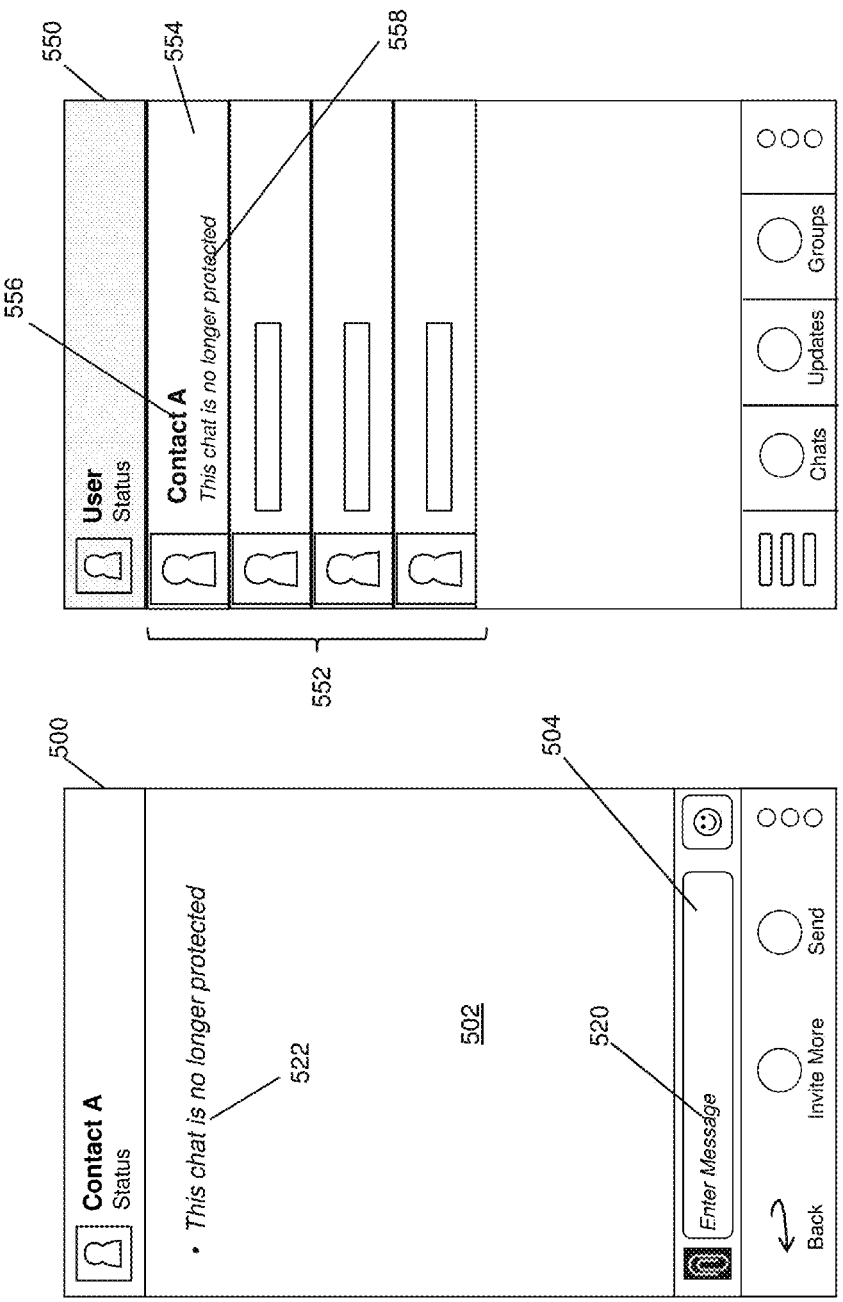

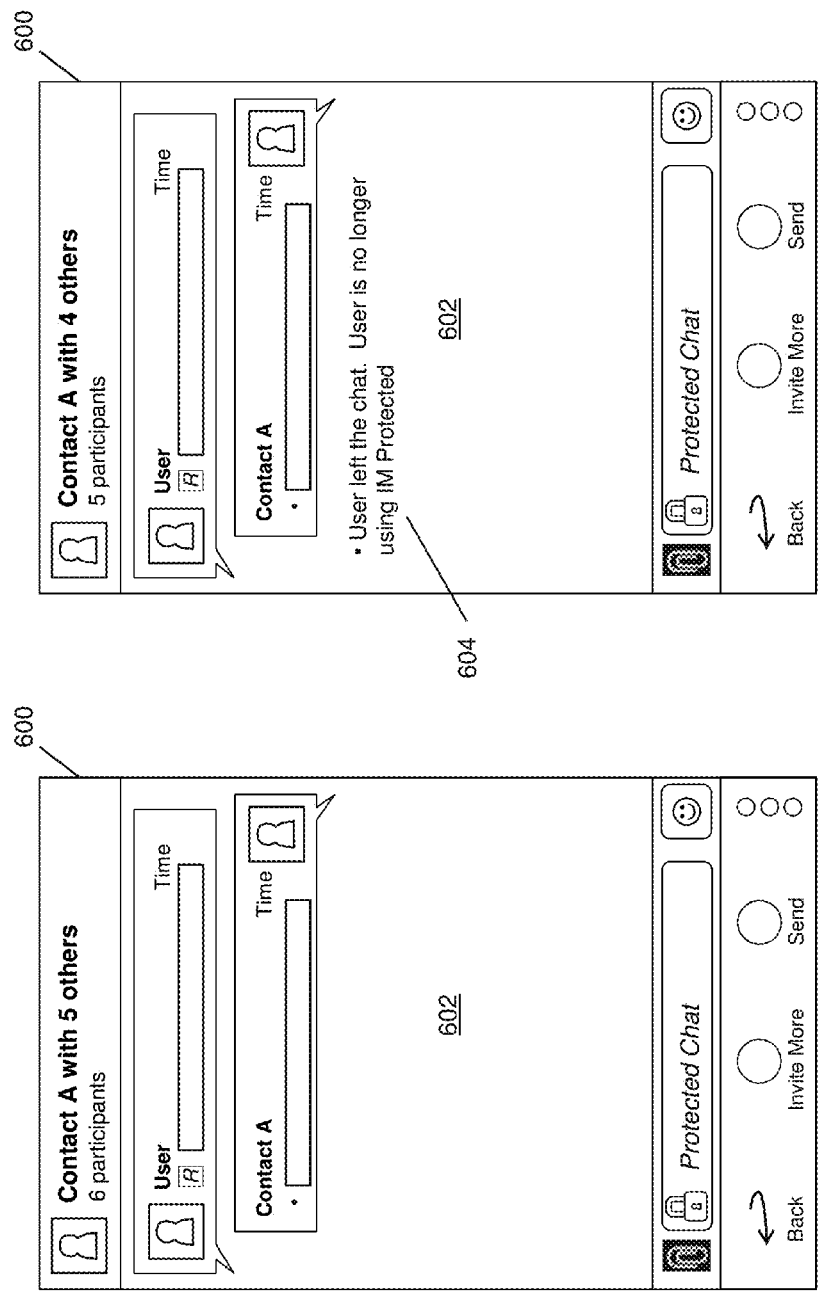

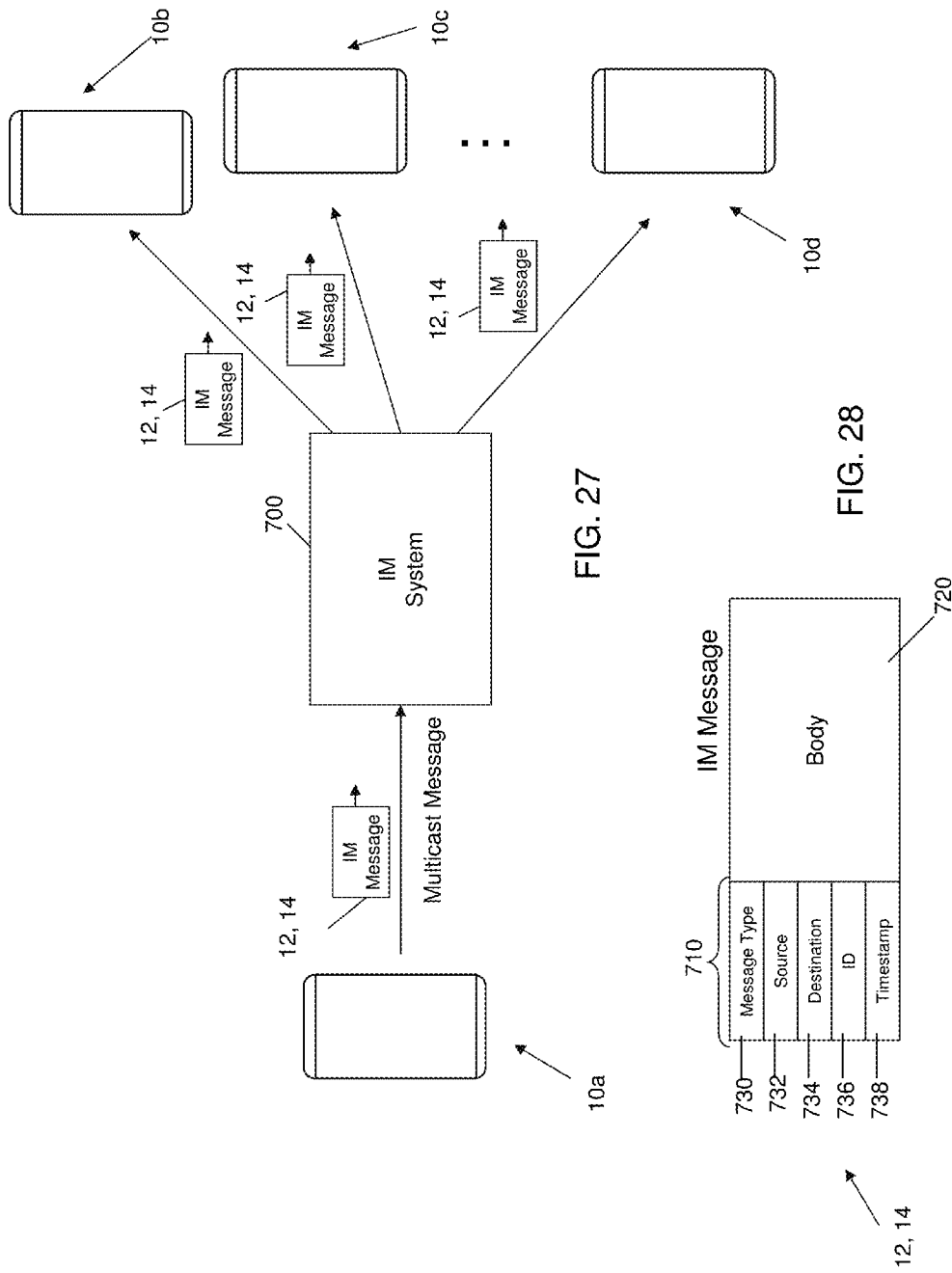

SYSTEM AND METHOD FOR SWITCHING BETWEEN MESSAGING SECURITY POLICIES

TECHNICAL FIELD

The following relates to systems and methods for switching between messaging security policies.

DESCRIPTION OF THE RELATED ART

Incorporating at least some data security into electronic communications is paramount for many organizations, particularly in regulated industries and industries in which the nature of the content of such electronic communications is sensitive or confidential.

While data security can be applied in order to provide encryption and authentication, many electronic devices are vulnerable to various attacks, either due to inadequate or lack of security.

BRIEF DESCRIPTION OF THE DRAWINGS

Embodiments will now be described by way of example only with reference to the appended drawings wherein:

FIG. 2 is a schematic diagram illustrating IM security applied at a first policy level;

FIG. 3 is a schematic diagram illustrating IM security applied at a second policy level which is considered more secure than the first policy level shown in FIG. 2;

FIG. 9 is a screen shot of an example of a graphical user interface for a protected IM conversation;

FIG. 10 is a screen shot of an example of a graphical user interface for a default IM conversation;

FIG. 18 is a screen shot of an example of a graphical user interface for an IM groups UI subsequent to being downgraded;

FIG. 19 is a screen shot of an example of a graphical user interface for a one-to-one IM conversation UI subsequent to being downgraded;

FIG. 20 is a screen shot of an example of a graphical user interface for a one-to-one IM conversation UI subsequent to being downgraded;

FIG. 21 is a screen shot of an example of a graphical user interface for an IM chats list UI;

FIG. 22 is a screen shot of an example of a graphical user interface for a multi-user IM chat or group IM chat UI prior to removal of a participant;

FIG. 23 is a screen shot of an example of a graphical user interface for a multi-user IM chat or group IM chat UI subsequent to removal of a participant;

FIG. 27 is a schematic diagram illustrating multi-cast messaging;

FIG. 28 is a block diagram illustrating an example of a peer-to-peer message configuration.

DETAILED DESCRIPTION

Figure 1:
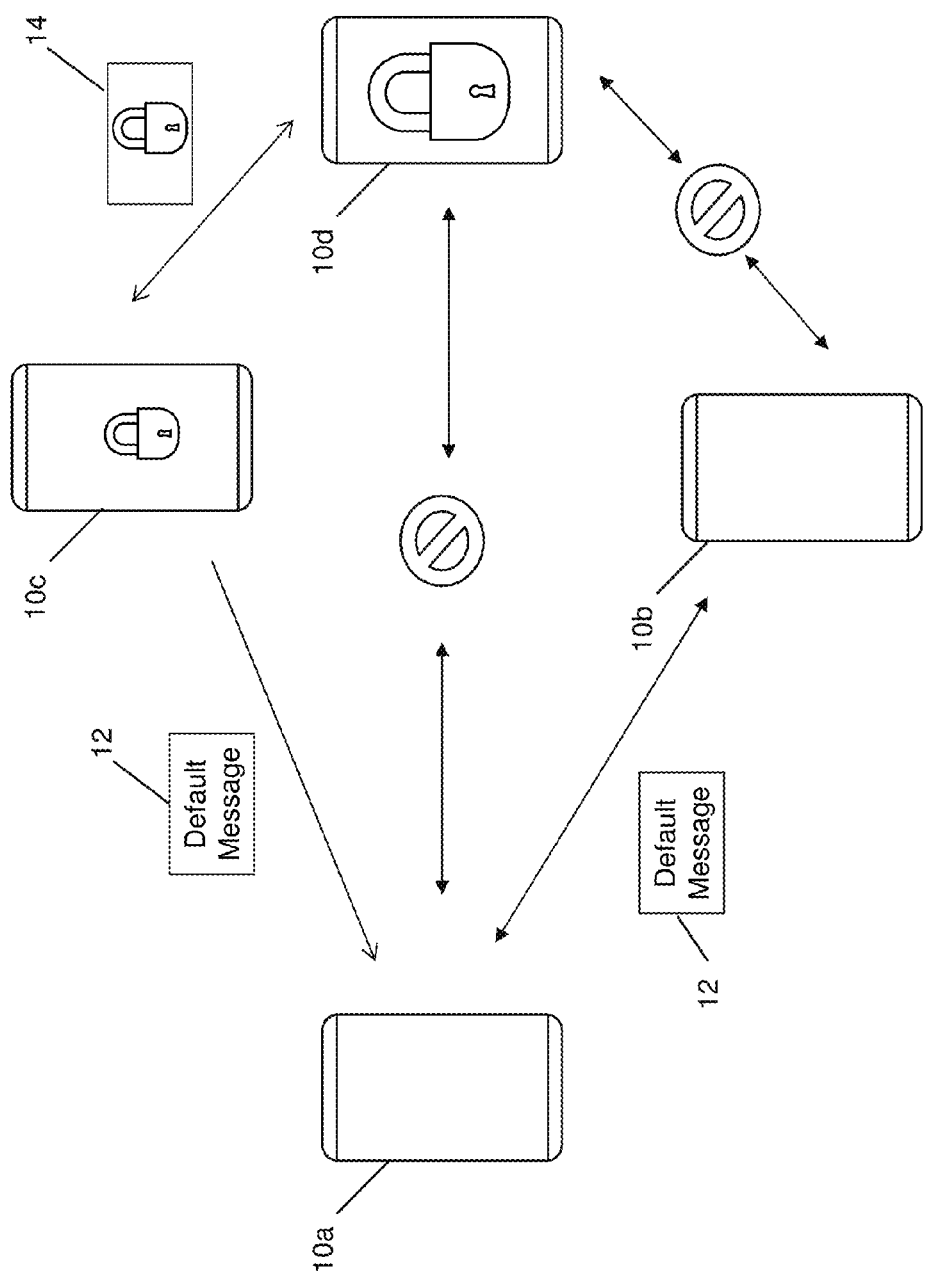
FIG. 1 is a schematic diagram illustrating messaging between mobile devices in accordance with various example policy types.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

While examples provided below may relate to mobile devices, it can be appreciated that the principles discussed herein are equally applicable to any electronic device capable of participating in messaging.

In one aspect, there is provided a method of operating an electronic device, the method comprising: determining that a messaging security policy for the electronic device has been downgraded from a higher security level to a lower security level; and removing protected content on the electronic device that has been subjected to the higher security level.

In another aspect, there is provided an electronic device comprising a processor, memory, and a display, the memory comprising computer executable instructions for: determining that a messaging security policy for the electronic device has been downgraded from a higher security level to a lower security level; and removing protected content on the electronic device that has been subjected to the higher security level.

In yet another aspect, there is provided a non-transitory computer readable storage medium comprising computer executable instructions for operating an electronic device, the computer executable instructions comprising instructions for: determining that a messaging security policy for the electronic device has been downgraded from a higher security level to a lower security level; and removing protected content on the electronic device that has been subjected to the higher security level.

FIG. 1 illustrates a messaging environment in which various mobile devices 10 communicate with each other according to multiple different security policies, modes, states, or levels (hereinafter referred to commonly as "policies"). First and second mobile devices 10a, 10b are operating in this example according to a default, base, or lowest level policy (hereafter referred to as a "default" policy) having a lowest or baseline level of security among a plurality of policy levels. For example, the default policy can have encryption based on an encryption/decryption key stored on the mobile device 10 at the time of manufacture, which is common to all mobile devices 10 of a particular type. It can be appreciated that the default policy can include a lowest level of security or no security at all.

As shown in FIG. 1, the first and second mobile devices 10a, 10b can communicate default IM messages 12 between each other, but have limited if any capability of communicating with mobile devices 10 having a higher level policy. In the example shown in FIG. 1, two additional policy levels are shown, each applying additional cryptographic protection as will be explained in greater detail below, but having different policy rules for the manner in which IM messages can be communicated. For example, a third mobile device 10c is operating according to an intermediate policy which allows the third mobile device 10c to communicate with other mobile devices 10 that are operating according to a policy level that is higher than the default policy using protected IM messages 14, e.g., a further mobile device 10d. The third mobile device 10c can communicate with the first mobile device 10a (or second mobile device 10b) using default messages 12, namely messages that utilize the default cryptographic protocols, in which case the additional or strengthened security is not utilized. The fourth mobile device 10d in this example is subjected to a highest policy level and can only communicate with other mobile devices 10 that are capable of exchanging protected IM messages 14, for example only the third mobile device 10c in FIG. 1. It can be appreciated that a policy can include multiple different levels with that policy. For example, one policy level can be used for assigning a level of encryption, and another policy level can be used for indicating whether or not the user can message a contact having a lower level of encryption.

The intermediate policy can be applied by organizations or individuals that wish to be able to exchange protected IM messages 14 in appropriate circumstances, e.g., when communicating sensitive content with work colleagues. The highest restriction level can be applied by organizations who wish to completely limit communications for that particular device under all circumstances, e.g., for government employees or those in a highly regulated industry.

It can be appreciated that the number of policy levels shown in FIG. 1 is for illustrative purposes only. For example, two policy levels may be used in which a default policy level and one additional higher security level are available. Similarly, more than three policy levels may be used, e.g., to provide a gradient of cryptographic security according to the applied policy level.

An example of a default level of cryptography used to generate default IM messages 12 is illustrated in FIG. 2. In the messaging scenario depicted in FIG. 2, a first mobile device 10a exchanges messages with a second mobile device 10b via a messaging infrastructure 18 (e.g., PIN-based messaging as illustrated in FIGS. 34-36 below). The first mobile device 10a communicates over at least one first network 16a (e.g., WiFi, cellular, Internet, etc.) in order to have the messaging infrastructure 18 facilitate delivery of messages to the second mobile device 10b over at least one second network 16b. A policy authority 20 is in communication with the first and second mobile devices 10a, 10b to facilitate the provision of keys and/or keying material, digital certificates, etc. Two security mechanisms are used in the default scenario shown in FIG. 2, namely encryption 24 and transport security 22. For example, the transport security 22 can be applied using transport layer security (TLS) or similar protocols such as secure sockets layer (SSL), a TLS predecessor. The messaging infrastructure 18 may also use a user identifier (ID) to perform authentication, e.g., using a single sign-on identity service. The user identifier can also be tied to a device ID, e.g., a PIN). The encryption 24 can be applied using any suitable cryptographic protocol. For illustrative purposes, each mobile device 10 can store a symmetric messaging encryption key, which is used to encrypt and decrypt messages exchanged with other mobile device 10, e.g., a symmetric-key block cipher such as a Triple Data Encryption Standard (DES) key having a desired key size. The symmetric messaging encryption key can also be used to authenticate received default messages 12. As noted above, the symmetric messaging encryption key can be a global encryption key added to each mobile device 10 at the time of manufacture to ensure each device is capable of exchanging default messages 12 and thus utilize at least a default level of security.

When implementing multiple levels of security, the policy authority 20 can be used to issue, revoke, renew, and otherwise manage security policies for the mobile devices 10. The policy authority 20 can be a third party service such as an application server or storefront, or can be implemented at an enterprise level where IT policies are controlled within an enterprise.

The relatively more secure cryptography applied to protected IM messages 14 is illustrated in FIG. 3. As can be seen in FIG. 3, in addition to encrypting messages using the default encryption 24 and applying transport security 22, an additional cryptographic mechanism 26 is utilized to further protect confidentiality and data integrity. The additional cryptographic mechanism 26 can be selected according to any desired or imposed security regulations, guidelines, standards, etc. In the present example, elliptic curve cryptography (ECC) is utilized, for example an Elliptic Curve Password-Authentication Key Exchange (EC-SPEKE) to securely exchange a symmetric key by protecting the exchange using a password, a key derivation function (KDF) to securely derive message keys from shared secrets, messaging signing using the Elliptic Curve Digital Signature Algorithm (ECDSA), and a one-pass Elliptic Curve Diffie-Hellman (ECDH) protocol to derive new shared secrets between two correspondents using a private key of one correspondent and a public key of the other. It can be appreciated that such an additional cryptographic mechanism 26 is illustrative and various other cryptographic mechanisms 26 can be used to utilize protected IM messages 14.

One example for utilizing protected IM messages 14 will now be described by way of example, in which the mobile device 10 may utilize a default policy or a "protected" policy. Each mobile device 10 that is subjected to the protected policy utilizes two long-term public/private key pairs that are static for the device and associated user, namely an encryption key pair and a signing key pair. To communicate protected IM messages 14, the mobile device 10 creates a pair-wise key with each contact that is also using the protected policy. For one-to-one communications, the pair-wise key can be considered a session key. The session key is used to encrypt all messages within an IM conversation. The pair-wise key is derived from the initiator's private encryption key and the recipient's public encryption key, e.g., using one-pass ECDH. Each session key is combined with unencrypted (but signed) keying material in the protected IM message 14 to produce a message encryption key. The message encryption key is derived from the keying material and session key, using a KDF.

Figure 4:
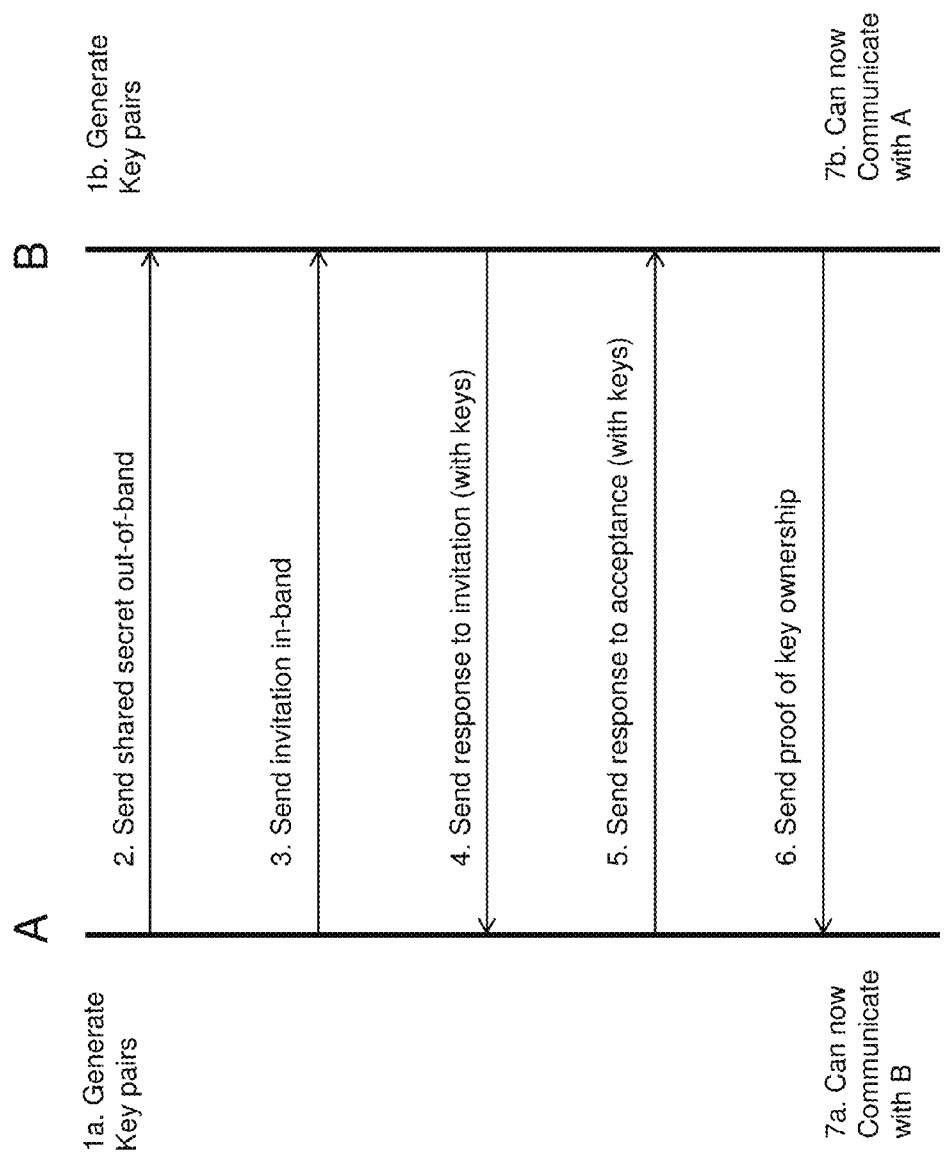
FIG. 4 is a flow chart illustrating a key exchange protocol between two mobile devices.

FIG. 4 illustrates an example of an ECDH key exchange process. The key exchange process is used to establish contact-specific keys for each IM contact with which a particular mobile device 10 wishes to communicate in accordance with the protected policy. In order to exchange keys, the parties exchange a shared secret (referred to hereinafter as a "pass phrase", which illustrates one example of such a shared secret) using an out-of-band communication channel, i.e., using a communication medium other than the messaging infrastructure 18 used to conduct IMing. For example, the out-of-band mechanism can include email, SMS, telephone, manual delivery (in person), short-range communications (e.g., NFC, WiFi, Bluetooth, infrared, etc.), etc. The shared secret can be generated in various ways, for example, using an auto-generated pass phrase. As discussed below, the pass phrase can be editable and/or can be user-supplied. It can also be appreciated that the pass phrase can be utilized in its original format, or can be converted to another format such as binary, hexadecimal, etc. The out-of-band exchange makes malicious third party attacks more difficult since such a third party should not know when or how the secret will be shared. The attacker would need to intercept both connectivity over the messaging infrastructure 18 and the out-of-band channel used for the shared secret exchange in order to compromise the key exchange. The use of an out-of-band channel can also enable the messaging infrastructure 18 to be removed from the key management process, thus allowing further flexibility for enterprise and individual entities.

The key exchange process shown in FIG. 4 begins with correspondent A generating the encryption and signing key pairs at 1a and correspondent B generating encryption and signing key pars at 1b. In this example, correspondent A is the initiator and sends a shared secret (e.g., pass phrase) at step 2 using an out-of-band communication channel. After sending the shared secret, correspondent A sends a first IM message 12 at step 3 using the messaging infrastructure 18, which can be considered an invitation to begin a "protected" chat or conversation. The invitation can include contact information and an indication of the highest protocol version the associated mobile device 10 supports. Correspondent B in this example responds to the invitation at step 4 with an acceptance, including an indication of the highest protocol version they support, proof that correspondent B knows the secret password (i.e., an indication that the user or device has entered or accepted entry of the supplied shared secret), and correspondent B's long-term public encryption and public signing keys. Correspondent A then responds to the acceptance at step 5 with proof that correspondent A knows the secret password (i.e. to prove that another party did not supply the shared secret), correspondent B's long-term public encryption and public signing keys, and proof that correspondent A has the private keys corresponding to the public keys they claim to own, e.g., by performing a verifiable cryptographic operation using the private keys. Similarly, at step 6, correspondent B sends proof to correspondent A of ownership of the public keys they have provided. Once correspondent A verifies the proof sent in step 6, both parties know each other's public keys and that they belong to an entity that also knows the corresponding private keys, and an entity that knows the correct shared secret. At steps 7a and 7b, the correspondents A, B can begin exchanging protected IM messages 14.

Figure 5:
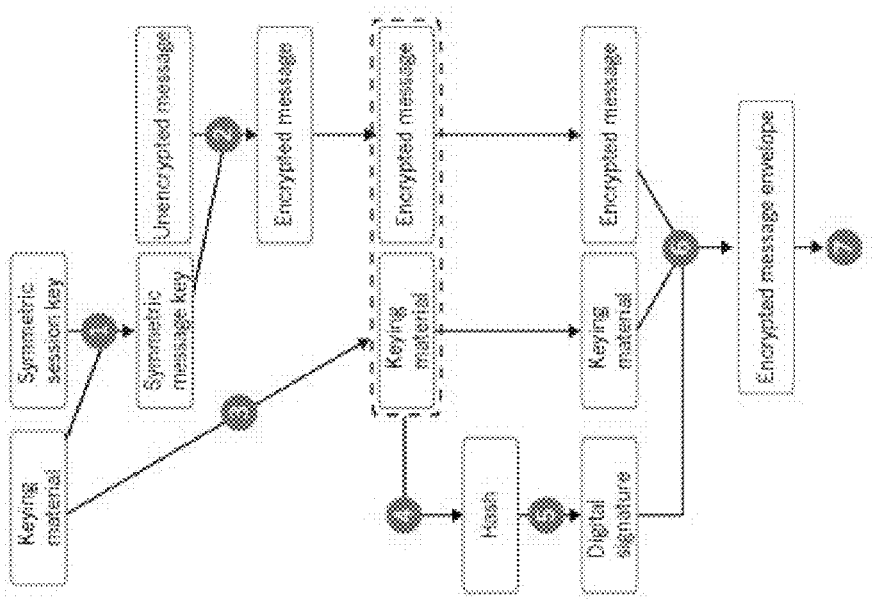
FIG. 5 is a flow chart illustrating computer executable operations that may be performed in encrypting an IM under the second policy level illustrated in FIG. 3.

Once the key exchange process has been completed, e.g., as shown in FIG. 4, the mobile devices 10 use the long-term signing and encryption key pairs to digitally sign and encrypt respectively a protected IM message 14, and to perform the complementary cryptographic processing for received messages. FIG. 5 illustrates an example of cryptographic processing applied to outgoing protected IM messages. In this example, both a message key and a session key are used, wherein the session key is a symmetric key shared by all conversation participants, and is established with a one-pass ECDH using the contact's public encryption key. At step 1, a message key is established with the KDF for each new message, using the session key and unique per-contact keying material. The unencrypted message is then encrypted using the symmetric message key at step 2 to generate an encrypted message, which is combined with the keying material at step 3 to recreate the message key in the unencrypted portion of the message being generated. The combined keying material and encrypted message is then hashed at step 4 (e.g., using SHA2-512), and the hash is signed at step 5 using the sender's private signing key, e.g. using ECDSA. The digital signature, keying material, and encrypted message are then wrapped into a message envelope at step 6 to generate a protected IM message 14, and the protected IM message 14 is passed to the transport layer at step 7 (e.g., to send the message using TLS).

Figure 6:
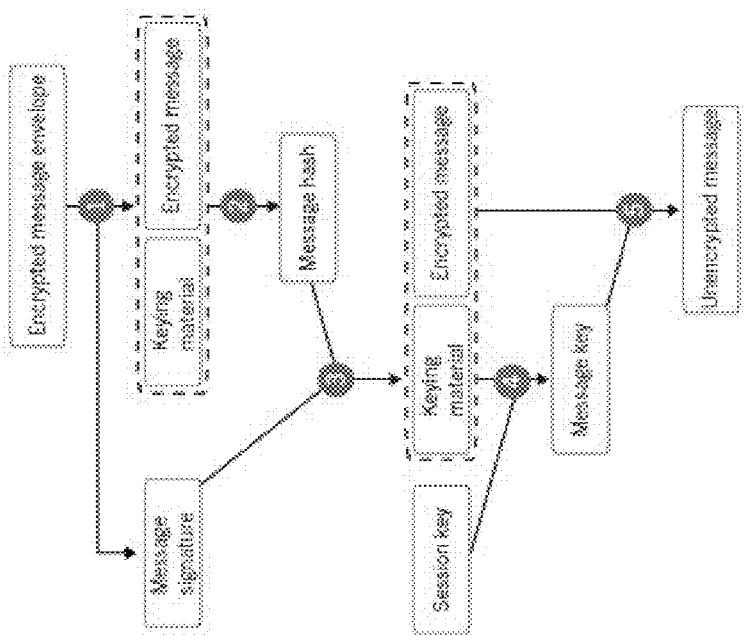
FIG. 6 is a flow chart illustrating computer executable operations that may be performed in decrypting an IM under the second policy level illustrated in FIG. 3.

FIG. 6 illustrates an example of cryptographic processing applied to incoming protected IM messages 14. The encrypted message envelope containing or otherwise corresponding to the protected IM message 14 is received and is processed at step 1 to parse the envelope and separate the digital signature from the keying material and encrypted message. The digital signature is decrypted using the sender's public signing key to obtain the message hash at step 2. The message hash is compared to a locally computed hash to determine if they match. If so, the recipient confirms that the sender sent the message (since only the sender has the private signing key corresponding to the public signing key), and that the message has not been altered (since the hashes match). The message hash and the digital signature are used at step 3 to verify the message signature using the sender's public key to determine whether or not the message is authentic. The message key is then derived at step 4 from the session key and the unencrypted keying material. The message is used at step 5 to decrypt the message, e.g., using AES in CTR mode in the examples discussed above.

Figure 7:
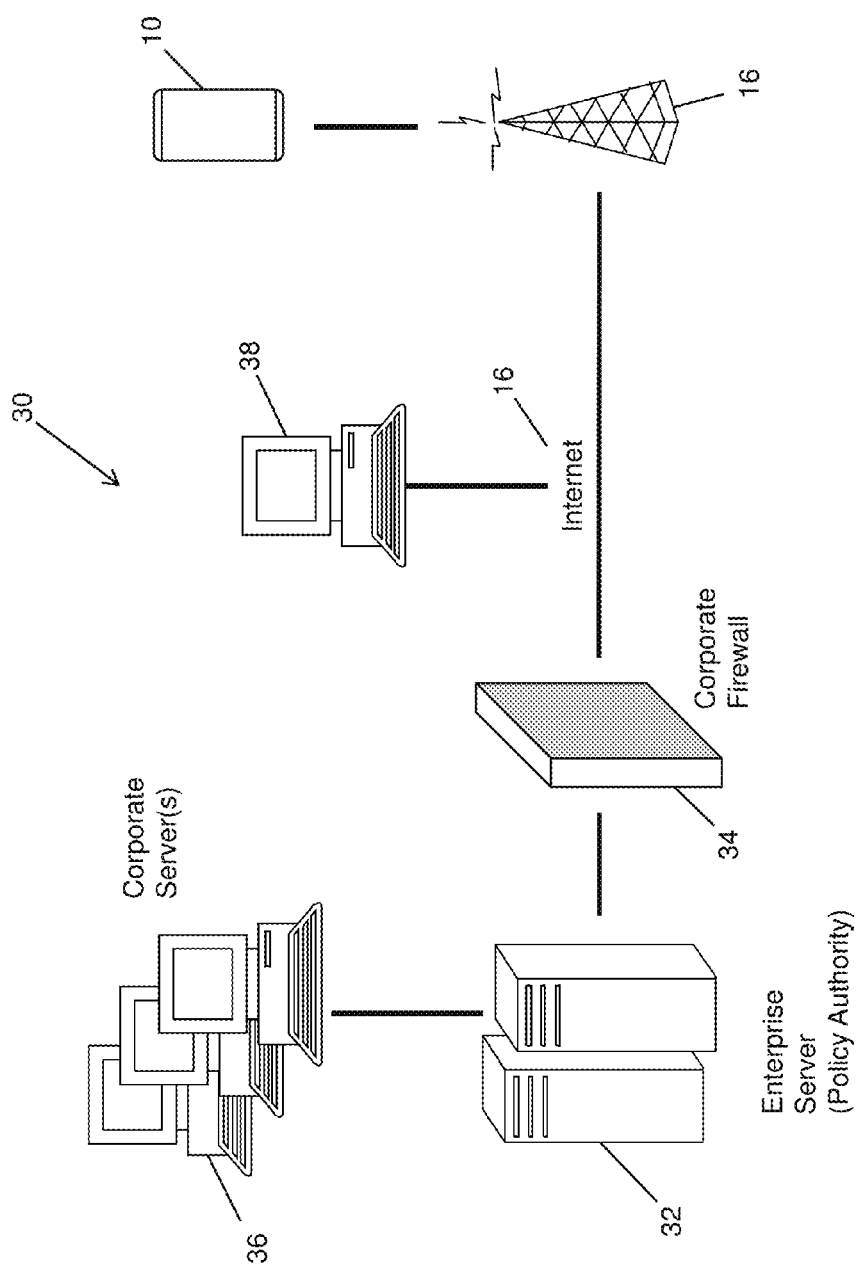
FIG. 7 is a schematic diagram illustrating an enterprise environment.

As discussed above, the protected policy can be utilized in an enterprise environment 30, an example of which is shown in FIG. 7. The enterprise environment 30 includes an enterprise server 32 and one or more corporate servers (e.g., mail server) 36 behind a corporate firewall 34 which enables individuals within the enterprise to communicate using the Internet and wireless networks 16, using mobile devices 10 and other computing devices 38. The enterprise server 32 can be used to deploy the protected policy, e.g., by pushing the policy out to enterprise devices. In this way, the enterprise server 32 can be used to enforce a higher level of security to be used by devices within the enterprise.

Figure 8:
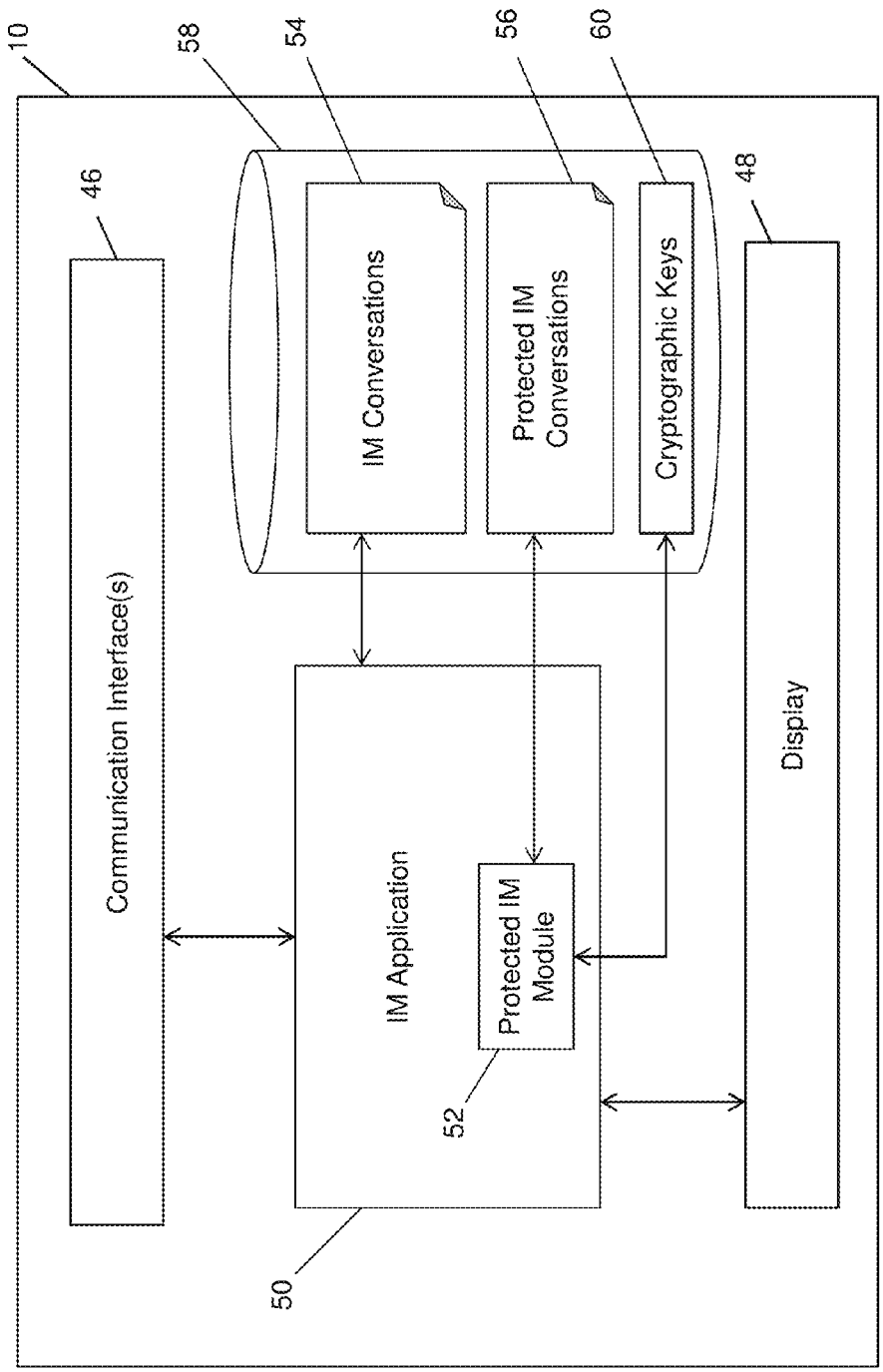
FIG. 8 is a block diagram illustrating an example of a configuration for a mobile device having an IM application.

Turning now to FIG. 8, an example of a configuration for a mobile device 10 is shown. The mobile device 10 includes one or more communication interfaces 46 to enable the mobile device 10 to communicate with other devices, services, and domains, e.g. to communicate via one or more networks 16 as shown in FIGS. 2 and 3. The one or more communication interfaces 46 in this example generally represents any one or more short-range, wide-area, wired, or wireless communication connections utilizing a connection/connector/port, wireless radio, etc. The mobile device 10 also includes a display component 48, which may be used by various applications and services on the mobile device 10 including an IM application 50 in the example shown in FIG. 8. The IM application 50 is also configured to utilize the one or more communication interfaces 46 to enable "IMing" on the mobile device 10.

The IM application 50 includes or otherwise has access to a protected IM module 52 for enabling participating in protected IM conversations 56 with other protected devices, as well as to participate in default IM conversations 54 with devices not subject to a protected policy. An IM storage 58 may therefore be included or otherwise accessible to the IM application 50 for storing protected IM conversations 56, default IM conversations 54, and the various cryptographic keys (and/or keying material) as discussed above. The cryptographic keys 60 would include a pair-wise key for each contact associated with the IM application 50 which can also communicate according to a protected policy. It can be appreciated that the delineation between components shown in FIG. 8 is for illustrative purposes and various other configurations are possible. It can also be appreciated that the allocations of memory storage are shown for illustrative purposes and various separate memory allocations and/or devices may be used, e.g., to securely store cryptographic keys in a hardware security module or other higher security component.

An example of a protected IM conversation user interface (UI) 100 is shown in FIG. 9. The protected IM conversation UI 100 includes a badge 108 or icon or other identifying feature in an input field 104 as well as the text "Protected Chat" 106 in order to identify the protected IM conversation UI 100 as being related to a protected conversation with a contact who is also subjected to a protected policy. It can be appreciated that other visual identifiers can be used such as different text colors, different fonts, border coloring, background coloring, etc. Moreover, the badge 108 could be placed in other locations within the UI 100, such as in a header portion near the avatar and contact name. FIG. 10 illustrates a default IM conversation UI 100', which does not include the badge 108 or text 106, but instead uses the text "Enter Message" 110 to differentiate between default and protected conversations. The protected IM conversation UI 100 is used subsequent to performing a key exchange with the corresponding contact, e.g., as shown in FIG. 4.

Figure 11:
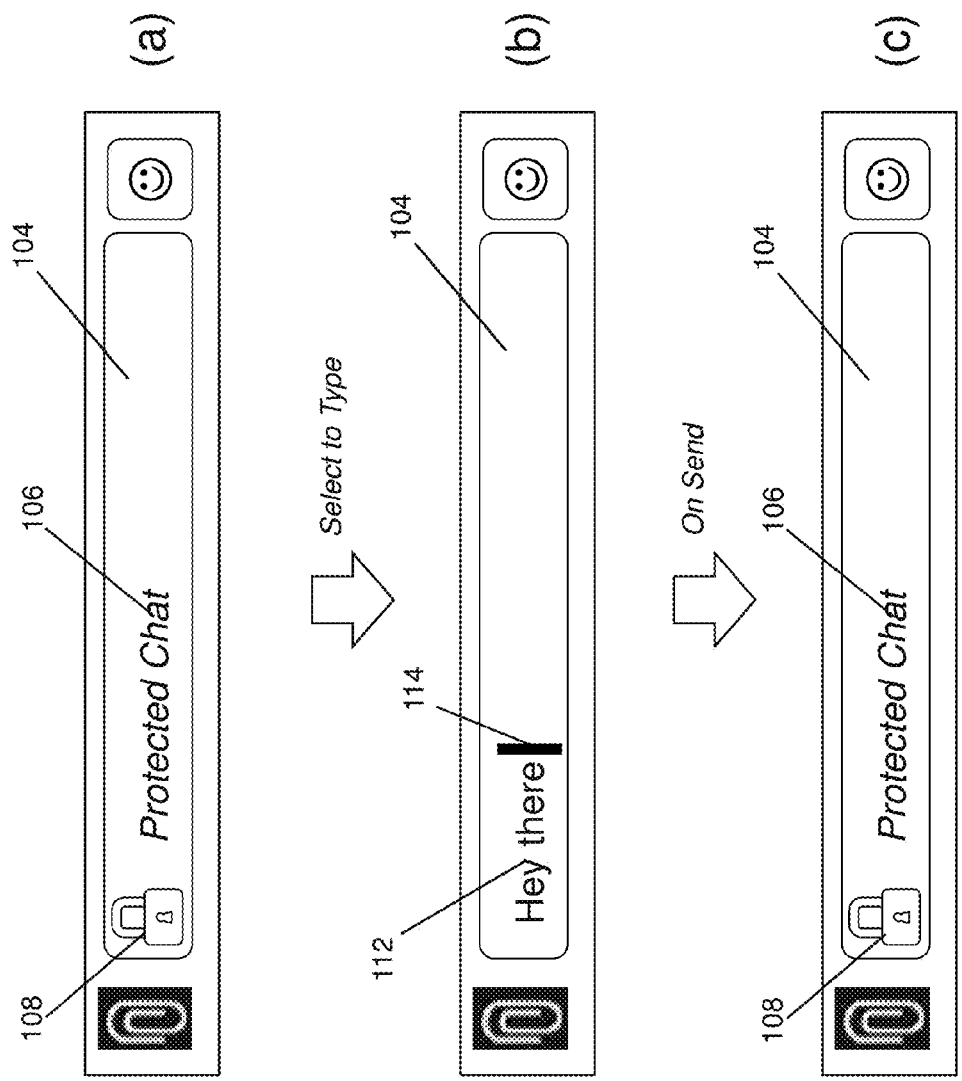
FIG. 11 illustrates a series of enlarged views of an input field for a protected IM conversation.

FIG. 11 illustrates an enlarged view of the input field 104 during message composition. In view (a), the badge 108 and "Protected Chat" text 106 are shown. When the input field 104 is selected for typing, the badge 108 and text 106 are removed as shown in view (b) to enable the message to be composed. After sending the composed message, the badge 108 and text 106 may be reinstated as shown in view (c). It can be appreciated that while the badge 108 is removed, the text being typed into the input field 104 can be changed (with respect to default text) to incorporate a consistent color to further extend the "protected" connotation when the badge 108 is removed. It can also be appreciated that in other examples the badge 108 can be caused to remain in the input field 104 at all times.

Figure 12:
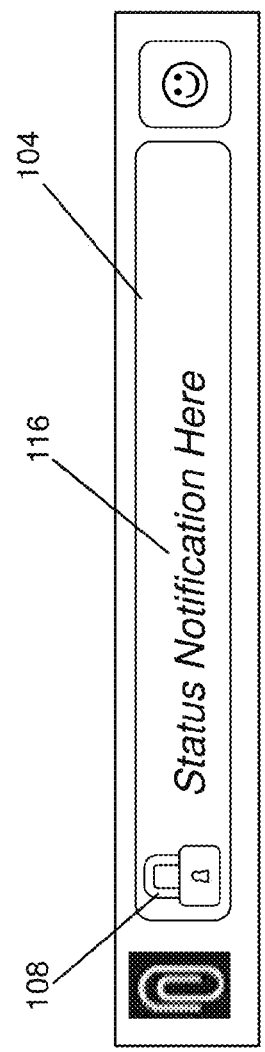
FIG. 12 is an enlarged view of an input field for a protected IM conversation including a status notification.
Figure 13:
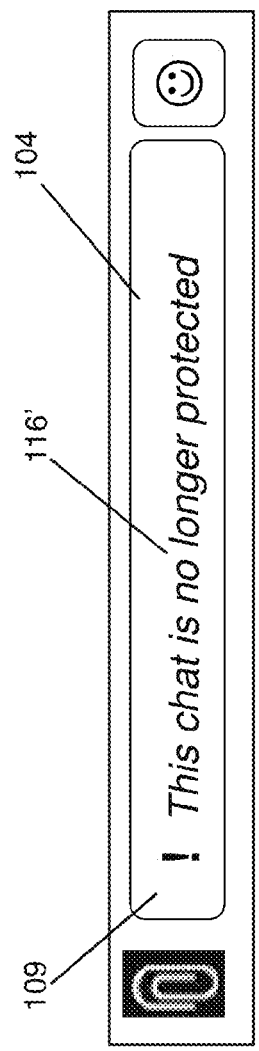
FIG. 13 is an enlarged view of an input field for a protected IM conversation including a status notification indicating that the IM conversation is no longer protected.

As shown in FIG. 12, the input field 104 can also be used to provide status notification text 116. FIG. 13 illustrates a specific example wherein the status notification 116' includes the text "This chat is no longer protected" after a security policy downgrade has been performed, details of which will now be described making reference to FIGS. 14 through 25.

It has been recognized that there are scenarios when a mobile device 10, which has been operating according to the protected policy, is downgraded or otherwise switched to a lower security such as the default policy described herein. One example scenario is when a user is subjected to the protected policy within an enterprise environment 30 of their employer, but then leaves the enterprise. Upon leaving the enterprise, the user's mobile device 10 is downgraded from the protected policy to the default policy (at least temporarily) but wishes to maintain their IM contacts and chats. In such scenarios, there typically exists protected content on that mobile device 10 that should be removed, as well as protected group and multi-person chat memberships or associations that should be removed or eliminated in order to maintain the integrity of the protected content.

It has been found that in addition to modifying conversation UIs to remove indications of being in a protected mode, state or under a protected policy (e.g., see FIG. 9 compared to FIG. 10 described above), in order to maintain one-to-one contacts and associated conversations, the associated conversation UIs may include protected content which should be removed. Moreover, it has been found that when the user belongs to a protected group or multi-user conversation (in which every member/participant is under the protected policy), membership to such groups and any group or multi-user conversations should be automatically deleted or removed (i.e. the user should "leave" the chats/groups) since they no longer meet the security requirements of those multi-user chats and groups.

Figure 14:
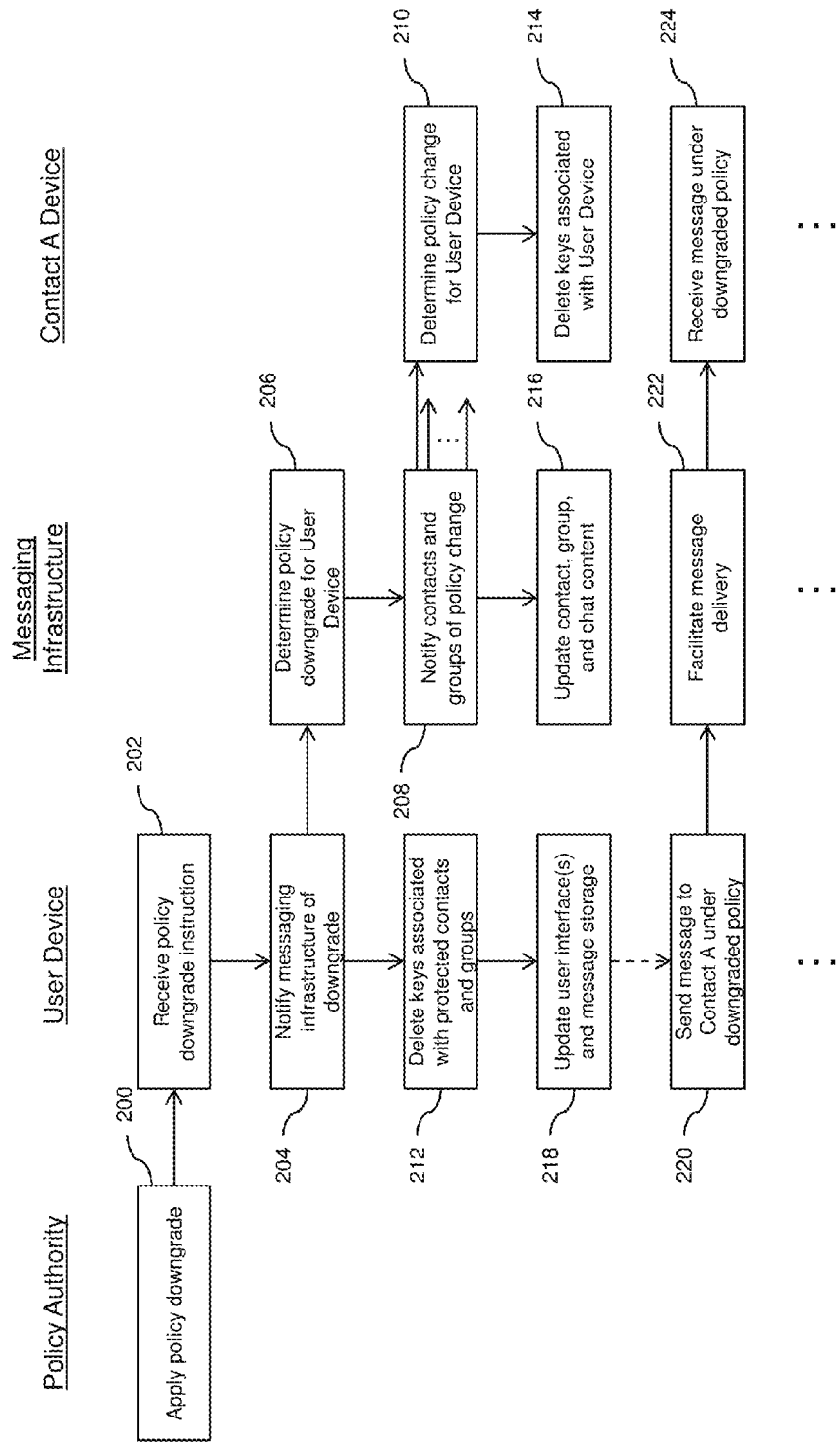
FIG. 14 is a flow chart illustrating computer executable operations that may be performed in downgrading an instant messaging security policy.

FIG. 14 is a flow chart illustrating operations performed upon a mobile device 10 (User's device in this example) being downgraded from the protected policy to a lower security policy such as the default policy. At 200 the policy authority 20 such as the enterprise server 32 applies a policy downgrade, e.g., due to a change in employment status, user permissions, etc. The User mobile device 10 receives the policy downgrade instruction at 202 (e.g., via a visible or transparent instruction), which causes the IM application 50 to be updated. For example, the IM application 50 may delete or remove the IM protected module 52 and/or any associated logic and data, and restart the application to apply new settings. Part of such updating includes notifying the messaging infrastructure 18 of the downgrade at 204 to enable the new "status" of User's mobile device 10 to be broadcast, advertised, or otherwise communicated to User's contacts (e.g., Contact A) and groups. The messaging infrastructure 18 determines that the policy for User has been downgraded at 206 and notifies the contacts and groups of this policy change at 208. The multiple arrows shown in FIG. 14 illustrate that multiple contacts and/or groups may be notified. In the example shown in FIG. 14, the mobile device 10 for Contact A determines the policy change for User's mobile device 10 at 210.

As discussed above, entering into protected IM chats and protected groups involves a key exchange process whereby keys are stored for each contact and group by the mobile device 10. Once the policy downgrade has been applied, the mobile device 10 automatically deletes the keys associated with the protected contacts and groups at 212 (including its own keys for communicating with the contacts and groups), which should be done transparently to the user. Similarly, by broadcasting the change in policy to the contacts and groups, Contact A knows to delete the keys associated with User's mobile device 10 at 214. The messaging infrastructure 18 may also update contact, group, and chat content which it stores server-side at 216. In some scenarios, the messaging infrastructure may move the underlying messaging database to a less secure location (e.g., when "data at rest" protection is no longer required). The mobile device 10 for User also updates the IM user interfaces and message storage 58 in order to comply with the downgrade instruction. For example, as discussed below, the mobile device 10 can delete protected content within chats (i.e. IM content that has been subjected to a higher security level than a lower security level associated with the downgraded policy or policy security level) and remove list entries associated with protected groups to block the user from accessing those groups, with the same principles applying to multi-user chats.

Subsequently, and assuming that Contact A is not subjected to a protected policy that prohibits messaging with devices subjected to lesser security, the mobile device 10 for User can send a default IM message 12 to Contact A at 200 under the downgraded policy, which in the above examples, would include encryption using the global symmetric key and transport security being applied (e.g., see FIG. 2), but not the additional cryptographic processing shown in FIGS. 5 and 6. Delivery of the default IM message 12 is facilitated by the messaging infrastructure 18 at 222, and the default IM message 12 is received by Contact A's mobile device 10 at 224. Subsequent messaging can continue using the default security until the mobile device 10 for User is upgraded to a higher security level (if at all).

Figure 15:
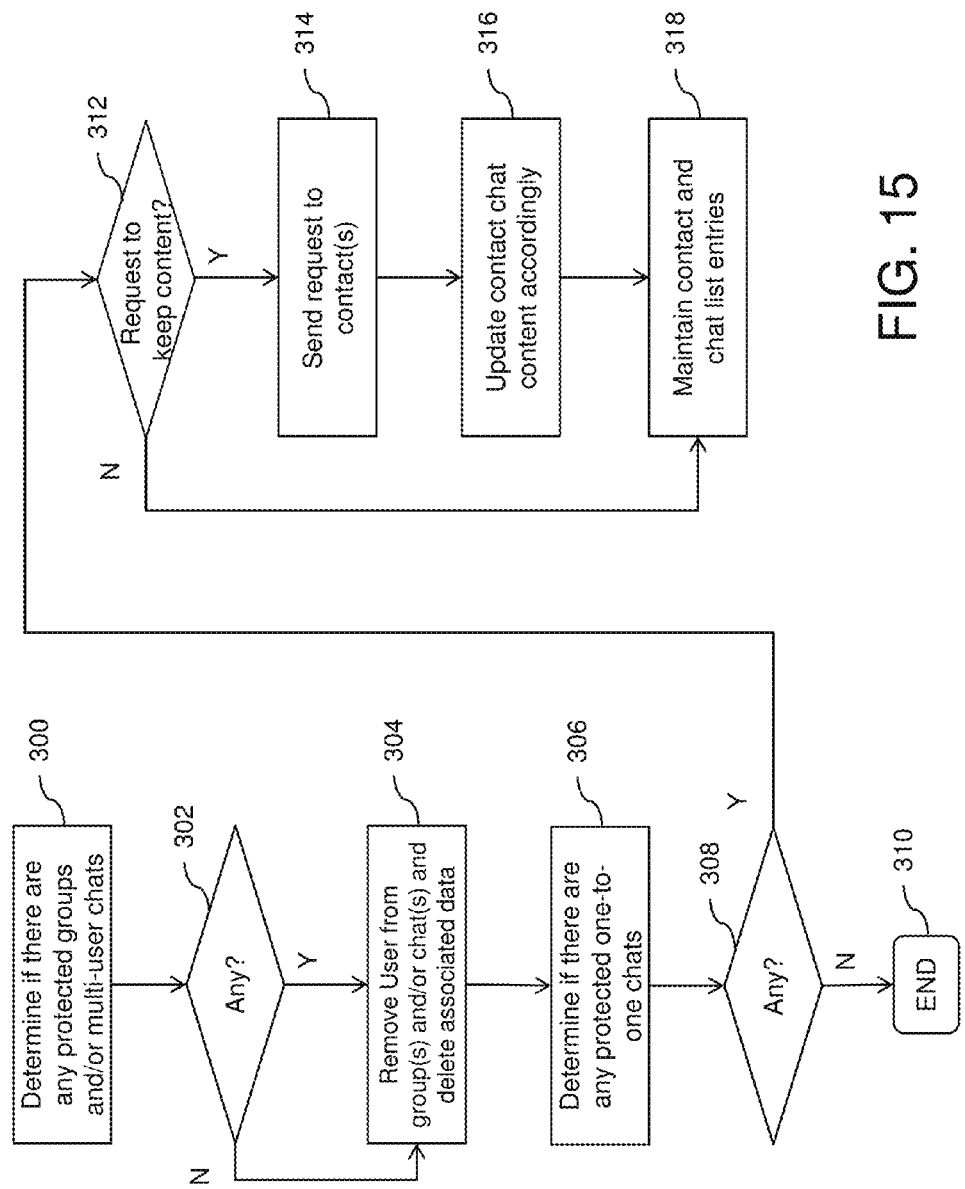
FIG. 15 is a flow chart illustrating computer executable operations that may be performed in removing protected content subsequent to a policy downgrade.

FIG. 15 is a flow chart illustrating operations performed by an IM application 50 in processing protected content (e.g., contacts, messages, pictures, videos, lists, voice notes, events, calendars, data files, etc.) and/or group membership after a policy downgrade. At 300 and 302, the IM application 50 determines if there are any protected groups and/or multi-user chats. Since these groups and conversations would require that each member use a protected policy in order to be considered a protected group or protected multi-user chat, the protected policy instruction in this example enforces automatic removal of a downgraded mobile device 10. If any such groups or multi-user chats exist, User is removed from them, and associated data is deleted at 304. At 306 and 308 the IM application then determines if any protected one-to-one chats exist (e.g., an IM conversation between only User and Contact A). If not, the process ends at 310. If any protected one-to-one chats exist, the IM application 50 determines at 312 whether or not it should make a request for at least some of the content to be kept. For example, an IM conversation between co-workers could include both personal and work-related content. The downgrade policy instruction may therefore allow a user to request to keep at least some content. This can be accomplished via user preferences, by displaying a prompt, etc. For example, upon being downgraded, the user can be prompted whether or not they wish to keep any chat content. By selecting "Yes" the IM application 50 can enable the user to browse and select content (e.g., photos) prior to deleting the remaining content.

As shown in FIG. 15, the downgrade policy instruction can also require that the user obtain permission from the associated contact(s) in order to keep content exchanged in a protected chat, by sending a request to such contact(s) at 314. The chat content for the contacts is then updated at 316 according to the rules, permissions, etc. that apply in the present circumstances, with the contact and chat list entries being maintained at 318, with any content that can be kept.

Figures 16, 17:
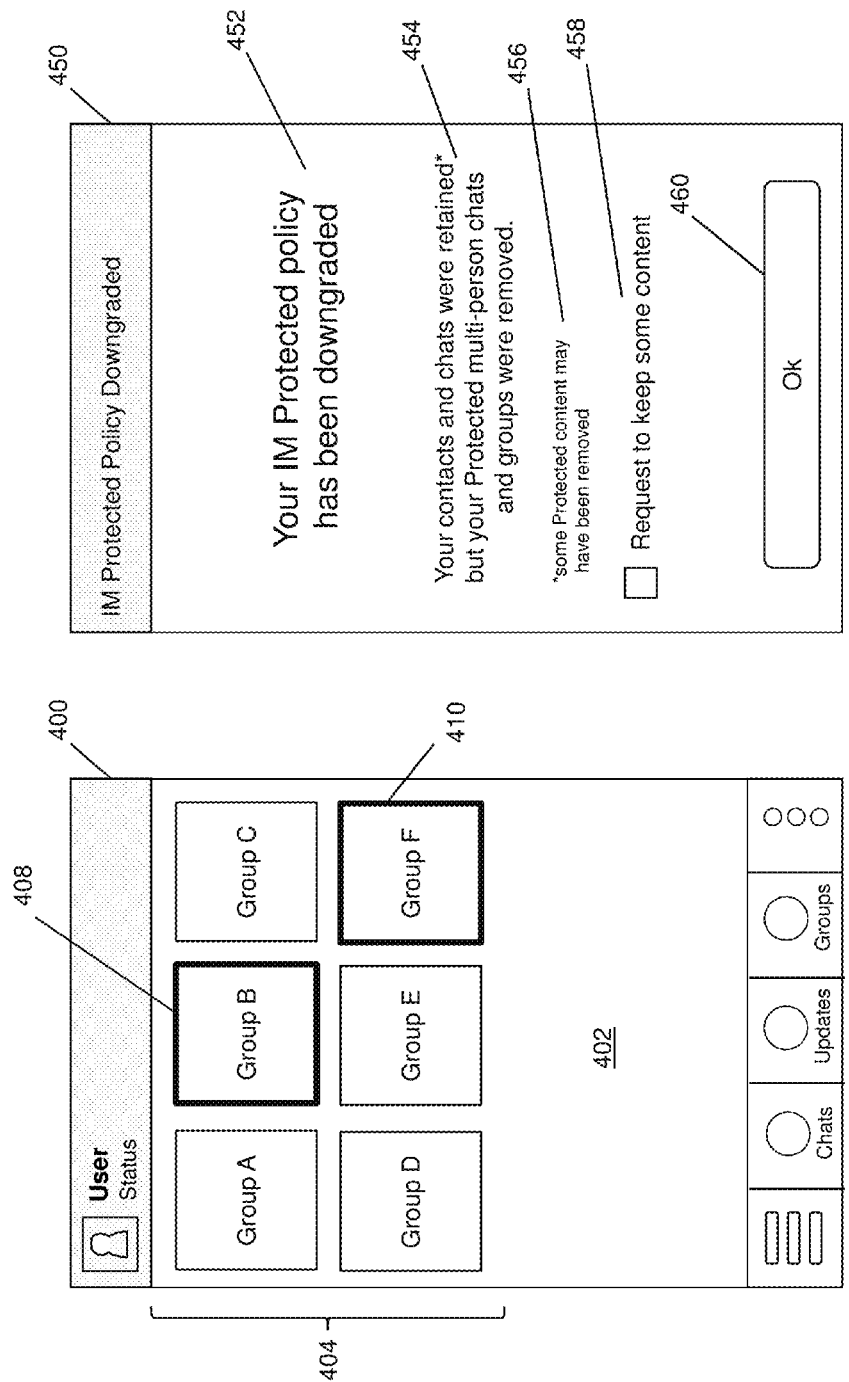
FIG. 16 is a screen shot of an example of a graphical user interface for an IM groups UI prior to being downgraded.
FIG. 17 is a screen shot of an example of a graphical user interface for a system notification UI related to a policy downgrade.

FIGS. 16 through 25 illustrate various UI updates that may be applied upon a mobile device 10 experiencing a policy downgrade. FIG. 16 illustrates an IM group UI 400 prior to such a policy downgrade, i.e., while User is still operating under the protected policy. The IM group UI 400 includes a group tiles portion 402, which displays a series of group tiles 404, in this example for Groups A, B, C, D, E, and F. Groups B and F in FIG. 16 are highlighted and are considered protected groups. A group B tile 408 and a group F tile 410 are therefore accessible to User while User's mobile device 10 is operating under the protected policy.

FIG. 17 illustrates a system notification UI 450 indicating an IM protected policy downgrade. The system notification UI 450 includes a subject message 452 indicating that the policy has been downgraded, and an explanation message 454 which explains what has been done to the IM application 50 because of the downgrade. For example, as shown in FIG. 17, the explanation message 454 can indicate: "Your contacts and chats were retained but your Protected multi-person chats and groups were removed". The explanation message 454 in this example includes an asterisk to provide an additional explanatory message 456 indicating that some Protected content may have been removed from existing chats that remain. As shown in FIG. 17, a keep content request option 458 may be included to allow the user to select content that they wish to keep and request permission from the associated contact(s). It can be appreciated that requests to keep content can be enabled for one-to-one chats, as well as multi-user chats and groups by obtaining permissions from multiple correspondents if necessary. By pressing an Ok button 460 the user acknowledges the downgrade instruction, which if applicable would initiate a content selection and permission request process.

FIG. 18 illustrates a screen shot of the IM group UI 400 subsequent to a policy downgrade in which the series of group tiles 404 is updated to remove the tiles 408, 410 associated with the protected groups B and F.

For those one-to-one conversations that were considered protected, content may be removed as illustrated in FIGS. 19 and 20. In FIG. 19, the messages 504 in the messaging portion 502 of an IM conversation UI 500 are retained with the protected contents removed. A notification can be included in place of the removed content, e.g., "Protected Message Removed" as shown in FIG. 19. the input field 508 can also be updated as shown in FIG. 19 to include a warning badge 510 to emphasize that the conversation is no longer protected. Additionally, a downgrade notification 512 can be included in the input field 508, in this example the notification indicating: "This chat is no longer protected".

As shown in FIG. 20, the messages 504 in the messaging portion 502 may instead be completely removed and replaced with a status notification message 522 indicating that the chat is no longer protected. The input field 504 and "Enter Message" tag 520 may also revert to what is included in a default conversation UI 500. Various other notifications can be used to identify that a protected chat has been downgraded and the IM UIs such as those for chat lists and contact lists can be modified to remove badging and other distinguishing features to indicate that they are no longer protected contacts. For example, FIG. 21 illustrates a chats list UI 550 which includes a list 552 of all active chats. The chat list entry 554 associated with Contact A is identified as no longer being protected by highlighting the contact name 556 and including a status notification 558 indicating that a previously protected chat is no longer protected according to the protected policy.

FIG. 22 illustrates an IM conversation UI 600 for a multi-user chat or group. In this example, the IM conversation UI 600 is shown from the mobile device 10 of Contact A prior to User leaving the group or multi-user chat, wherein the chat header indicates 6 participants. After User's mobile device 10 has been downgraded, User is automatically removed from the group. FIG. 23 illustrates the IM conversation UI 600 after User has been removed indicating that there are now 5 participants. Also, the messaging portion 602 of the IM conversation UI 600 is updated to include a system message 604 indicating that User has left the chat (or group) since they are no longer using the protected policy. For example, User's mobile device 10 in this example can explicitly indicate to the other devices in the group that the mobile device 10 has removed itself from the group.

Figures 24, 25:
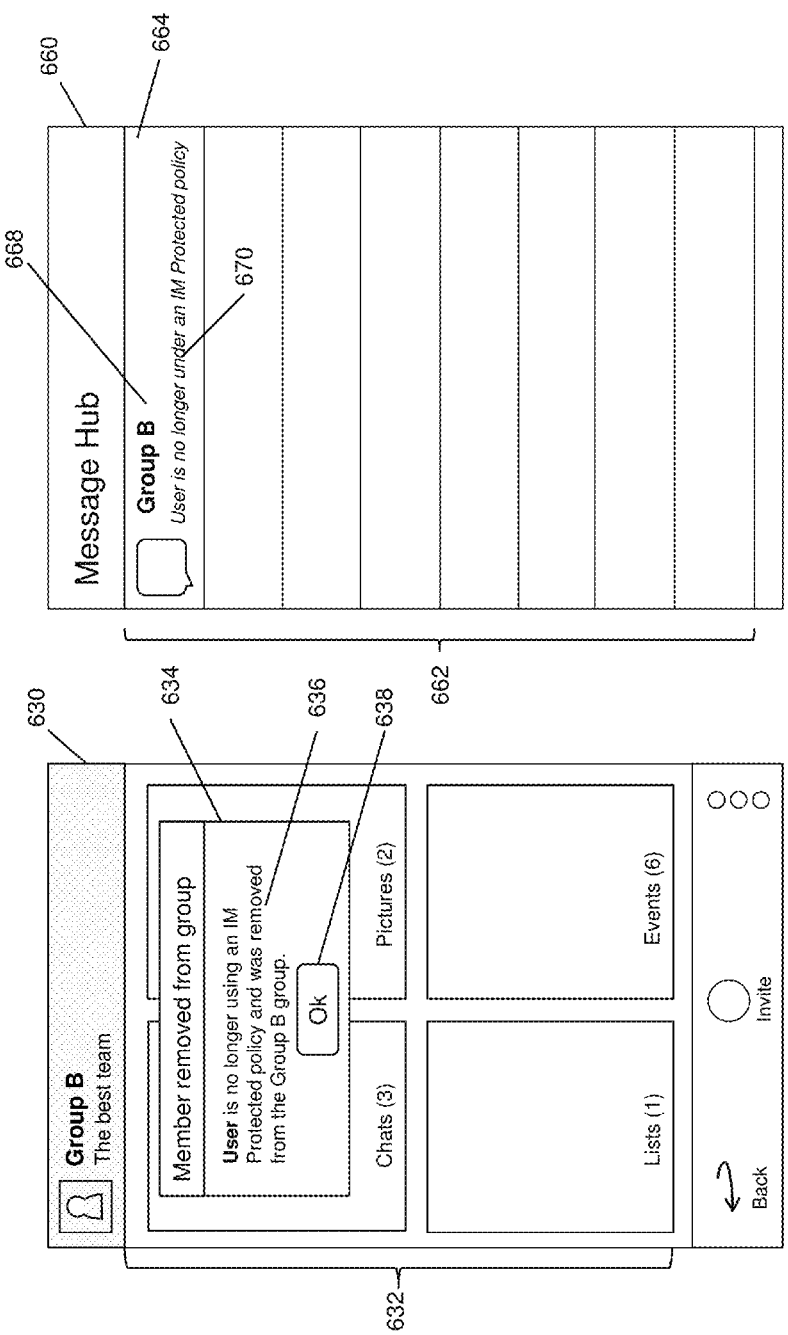
FIG. 24 is a screen shot of an example of a graphical user interface for an IM group UI.
FIG. 25 is a screen shot of an example of a graphical user interface for a message hub user interface illustrating a policy downgrade notification at a group member device.

An IM group may also receive other notifications when a member is removed for having been policy-downgraded. For example, a protected IM group UI 630 is shown in FIG. 24, which includes a series of group tiles 632 for various group applications such as chats, pictures, lists, events, etc. When detecting that a user has left the group for being downgraded, the IM application 50 on the remaining mobile devices 10 (e.g. Contact A) can provide a member removal dialog 634 as shown in FIG. 24. The member removal dialog 634 includes an explanatory message 636 to identify the reason for the member leaving the group, namely due to being downgraded from the protected policy. An Ok button 638 is provided to remove the member removal dialog 634. A message hub UI 660 may also be updated as shown in FIG. 25 to include a group notification entry 664 in the hub entry list 662 indicating that for Group B (being a protected group), User is no longer under the protected policy.

Accordingly, it can be seen that upon being downgraded from a relatively higher security policy to a relatively lower security policy, content associated with contacts, one-to-one conversations, groups, and multi-user conversations should be selectively removed to balance the competing objectives of ensuring that the downgraded user cannot access content which they are no longer allowed to access and complete disruption to the downgraded user by retaining at least contacts and conversations with contacts where applicable.

Figure 26:
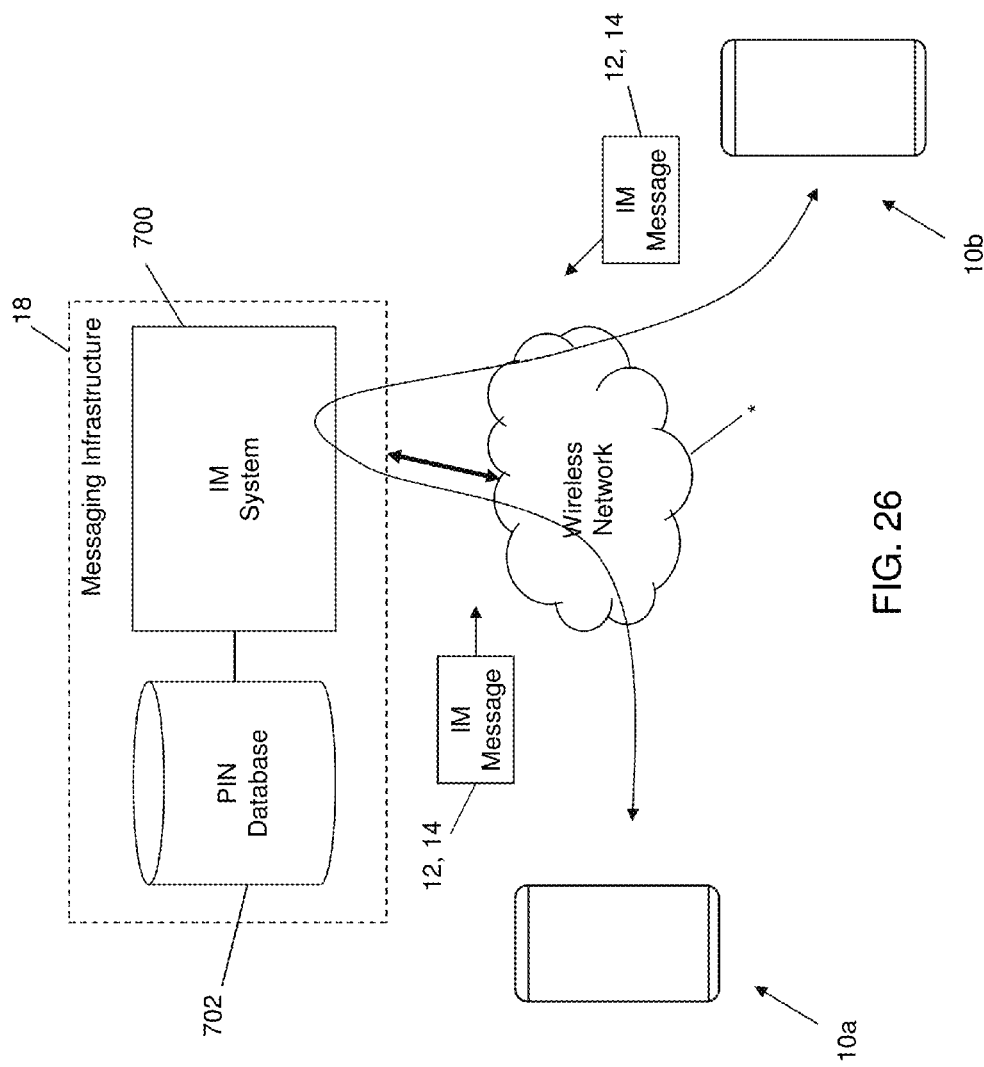
FIG. 26 is a schematic diagram illustrating an example of a peer-to-peer messaging environment.

For illustrative purposes, an example of a communication system including a messaging infrastructure 18 that enables mobile devices 10a, 10b to communicate via an IM (or other P2P-type) messaging system 700 over a wireless network 16, is shown in FIG. 26. It will be appreciated that the mobile devices 10a, 10b shown in FIG. 26 are shown as such for illustrative purposes and many other mobile devices 10 (not shown) may also be capable of communicating with or within the communication system. It will also be appreciated that although the examples shown herein are directed to mobile communication devices, the same principles may apply to other devices capable of communicating with the IM system 700. For example, an application (not shown) hosted by a desktop computer or other "non-portable" or "non-mobile" device (e.g., computer 38 shown in FIG. 7) may also be capable of communicating with other devices (e.g. including mobile devices 10) using the IM system 22.

The IM system 22 is, in this example, a component of the messaging infrastructure 18 associated with the wireless network 16. The messaging infrastructure 18 in this example includes, in addition to the IM system 22, and among other things not shown for simplicity, a personal identification number (PIN) database 702. The PIN database 702 in this example embodiment is used to store one or more PINs associated with respective mobile devices 10, whether they are subscribers to a service provided by the messaging infrastructure 18 or otherwise.

A first mobile device 10a may communicate with a second mobile device 10b and vice versa via the IM system 700, in order to perform IM messaging or to otherwise exchange IM-based communications. For ease of explanation, in the following examples, any IM-based communication may also be referred to as a IM message 12, 14 as shown in FIG. 26. It can be appreciated that only two mobile devices 10a, 10b are shown in FIG. 26 for ease of illustration and, for example, in an electronic group conversation, three or more mobile devices 10 would be participating in the group conversation. The IM system 700 in the example shown is configured to facilitate communication of both regular or default IM messages 12 utilizing a first level of security, and protected IM messages 14, utilizing a second level of security that is higher than the first level of security as discussed above by way of example. For example, the IM system 700 can identify from information included in the messages 12, 14 whether the message is a regular IM message 12 or a protected message 14 for the purpose of determining how to store a copy of the message 12, 14.

In some example embodiments, the IM system 700 may be capable of sending multi-cast messages, i.e. forwarding a single message from a sender to multiple recipients without requiring multiple IM messages 12, 14 to be generated by such a sender. For example, as shown in FIG. 27, the IM system 700 can be operable to enable a single IM message 12, 14 to be sent to multiple recipients by addressing the IM message 12, 14 to multiple corresponding IM addresses, and having the IM system 700 multicast the message 12, 14 to those recipients.

An example of a IM message 12, 14 is shown in greater detail in FIG. 28, and has a format that is particularly suitable for a PIN-to-PIN based system. In a typical IM protocol, each IM message 12, 14 has associated therewith a source corresponding to the mobile device 10 which has sent the IM message 12, 14 and includes a destination identifying the one or more intended recipients. Each IM message 12, 14 in this example includes a body 720, which contains the content for the IM message 12, 14 (e.g. text, audio, images, video, or other data), and a header 710, which contains various fields used for transmitting and processing each IM message 12, 14. In this example, the header 30 includes a message type field 730 to specify the type of transmission (e.g. chat, registration, block, presence, etc.), a source field 732 to specify the device address for the sender, a destination field 734 to specify the device address(es) for the one or more intended recipients, an ID field 736 to identify the corresponding IM application (e.g., see IM application 50 in FIG. 8) and a timestamp field 738 to indicate the time (and if desired, the date) at which the IM message 12, 14 was sent by the designated sender. The message type field 730 may be used to designate whether the message 12, 14 is a regular IM message 12 or a protected IM message 14. However, the ID field 740 could also be used with a particular ID type being recognizable as a protected-type message 14. Another field could also be added to the header 710 to indicate protected IM messages 14.

It can be appreciated that in this example, the ID field 736 can be used to specify the application ID to identify a IM application on the mobile device 10. Where the IM application relates to, for example, an IM system, the message type field 730 can also be used to designate an IM communication, and the ID field 736 would then correspond to a conversation ID, i.e. a conversation thread the message 12, 14 corresponds to (e.g. such that each message 12, 14 is identified by the conversation in which it was sent).

Other information or attributes may be included in the IM message 12, 14, such as a subject field (not shown) to enable a subject for part or all of a conversation (in an IM example) to be transported with the IM message 12, 14 (e.g. to create new subjects, modify subjects, notify others of subjects, etc.), or application details field (not shown) to provide application-specific information such as the version and capabilities of the application.

The IM system 700 can utilize any suitable IM protocol operated by, for example, a IM router (not shown), which may be part of the messaging infrastructure 18. It can be appreciated however that a stand-alone IM configuration (i.e. that does not rely on the messaging infrastructure 18—not shown) may equally apply the principles herein. The IM system 700 may also enable mobile devices 10 to communicate with desktop computers thus facilitating, for example, communications such as instant messaging (IM) between mobile applications and desktop applications on the desktop computer.

The IM system 700 can be implemented using a router-based communication infrastructure, such as one that provides email, SMS, voice, Internet and other communications. Particularly suitable for hosting a IM messaging router, is a wireless router or server used in systems such as those that provide push-based communication services. In FIG. 26, the messaging infrastructure 18 facilitates IM communications such as instant messaging between mobile devices 10. IM messaging, such as IMing, is provided by an associated application stored on each mobile device 10, e.g. an IM application 50 as shown in FIG. 8, which can be initiated, for example, by highlighting and selecting an icon from a display as is well known in the art. The IM system 700 routes messages between the mobile devices 10 according to the IM protocol being used. For example, the IM protocol may define a particular way in which to conduct IM or other types of messaging.

In general, in a IM protocol, the sender of the IM message 12, 14 knows the source address of the intended recipient, e.g. a PIN. This may be established when the two devices request to add each other to their respective contact or buddy lists. A particular mobile device 10 can communicate directly with various other mobile devices 10 through the IM system 700 without requiring a dedicated server for facilitating communications. In other words, the IM system 700 enables the mobile devices 10 to communicate with each other directly over the network 16 in accordance with the IM protocol.

When conducting a IM session according to the example shown in FIG. 26, the mobile devices 10a, 10b can communicate directly with the messaging infrastructure 18 in a client based exchange where, as noted above, an intermediate server is not required. A IM message 12, 14 sent by one mobile device 10 is received by the messaging infrastructure 18, which obtains the source address for the intended recipient (or recipients) from information associated with the message 12, 14 (e.g. a data log) or from the message 12, 14 itself. After obtaining the recipient's address according to the IM protocol, the messaging infrastructure 18 then routes the message 12, 14 to the recipient associated with the mobile device 10 having such address (or recipients having respective addresses). The messaging infrastructure 18 typically also provides a delivery confirmation to the original sender, which may or may not be displayed to the user. The destination device can also provide such delivery information. The messaging infrastructure 18 may be capable of routing IM messages 12, 14 reliably as well as being capable of holding onto the IM messages 12, 14 until they are successfully delivered. Alternatively, if delivery cannot be made after a certain timeout period, the messaging infrastructure 18 may provide a response indicating a failed delivery. The messaging infrastructure 18 may choose to expire a message 12, 14 if a certain waiting period lapses.

Figure 29:
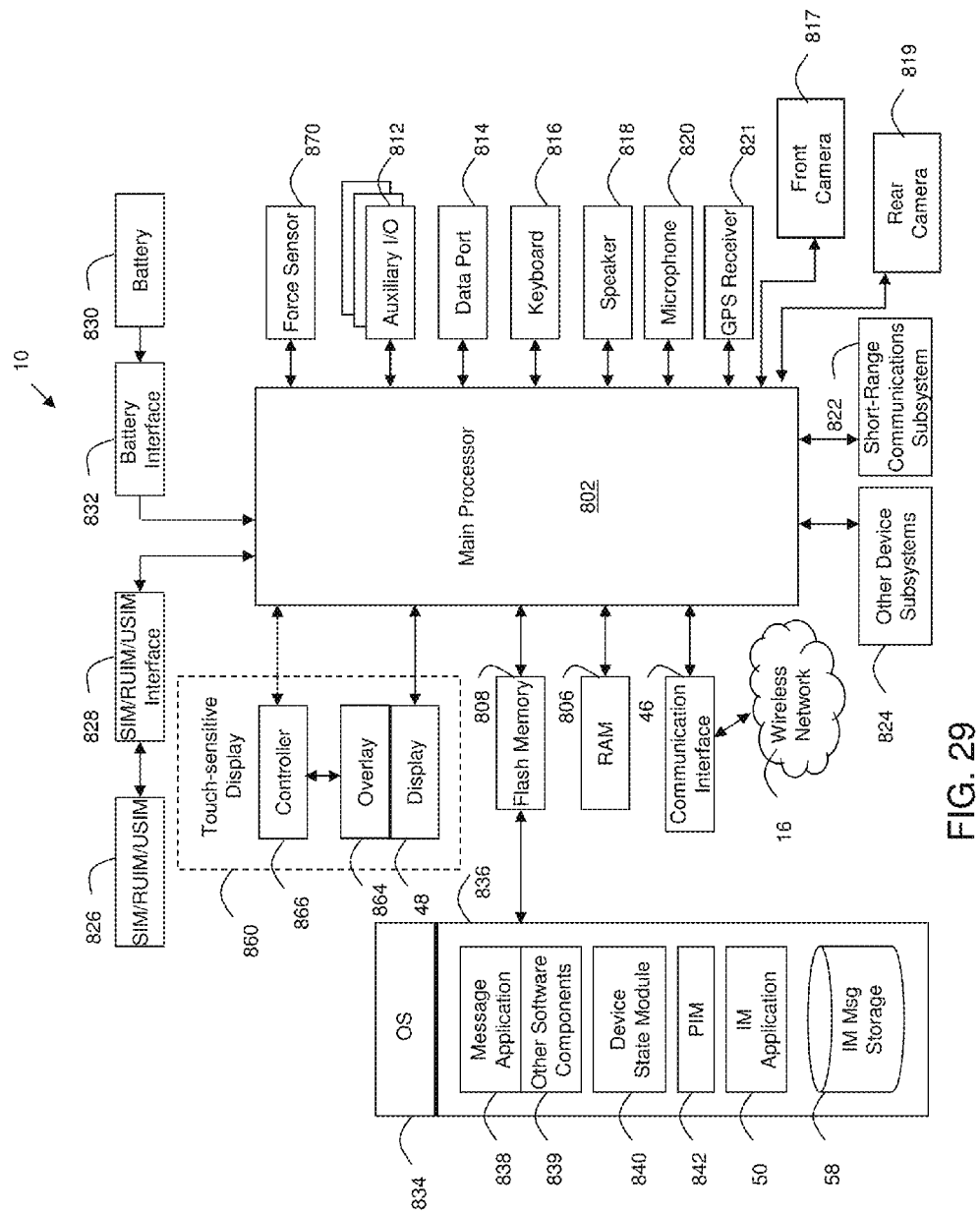
FIG. 29 is a block diagram of an example of a configuration for a mobile electronic communication device.

Referring to FIG. 29, to further aid in the understanding of the example mobile devices 10 described above, shown therein is a block diagram of an example configuration of a device configured as a "mobile device", referred to generally as "mobile device 10". The mobile device 10 includes a number of components such as a main processor 802 that controls the overall operation of the mobile device 10. Communication functions, including data and voice communications, are performed through at least one communication interface 46. The communication interface 46 receives messages from and sends messages to a wireless network 12'. In this example of the mobile device 10, the communication interface 46 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 46 with the wireless network 12' represents one or more different Radio Frequency (RF) channels, operating according to defined protocols specified for GSM/GPRS communications.

The main processor 802 also interacts with additional subsystems such as a Random Access Memory (RAM) 806, a flash memory 808, a touch-sensitive display 860, an auxiliary input/output (I/O) subsystem 812, a data port 814, a keyboard 816 (physical, virtual, or both), a speaker 818, a microphone 820, a GPS receiver 821, a front camera 817, a rear camera 819, short-range communications subsystem 822, and other device subsystems 824. Some of the subsystems of the mobile device 10 perform communication-related functions, whereas other subsystems may provide "resident" or on-device functions. By way of example, the touch-sensitive display 860 and the keyboard 816 may be used for both communication-related functions, such as entering a text message for transmission over the wireless network 12', and device-resident functions such as a calculator or task list. In one example, the mobile device 10 can include a non-touch-sensitive display in place of, or in addition to the touch-sensitive display 860. For example the touch-sensitive display 860 can be replaced by a display 48 that may not have touch-sensitive capabilities.

The mobile device 10 can send and receive communication signals over the wireless network 12' after required network registration or activation procedures have been completed. Network access is associated with a subscriber or user of the mobile device 10. To identify a subscriber, the mobile device 10 may use a subscriber module component or "smart card" 826, such as a Subscriber Identity Module (SIM), a Removable User Identity Module (RUIM) and a Universal Subscriber Identity Module (USIM). In the example shown, a SIM/RUIM/USIM 826 is to be inserted into a SIM/RUIM/USIM interface 828 in order to communicate with a network.

The mobile device 10 is typically a battery-powered device and includes a battery interface 832 for receiving one or more rechargeable batteries 830. In at least some examples, the battery 830 can be a smart battery with an embedded microprocessor. The battery interface 832 is coupled to a regulator (not shown), which assists the battery 830 in providing power to the mobile device 10. Although current technology makes use of a battery, future technologies such as micro fuel cells may provide the power to the mobile device 10.

The mobile device 10 also includes an operating system 834 and software components 836 to 842, 50 and 58. The operating system 834 and the software components 836 to 842, 50 and 58, that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 842, 50 and 58, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, may be installed on the mobile device 10 during its manufacture. Software applications may include a message application 838, a device state module 840, a Personal Information Manager (PIM) 842, an IM application 50, and an IM message storage 58. A message application 838 can be any suitable software program that allows a user of the mobile device 10 to send and receive electronic messages, wherein messages are typically stored in the flash memory 808 of the mobile device 10. A device state module 840 provides persistence, i.e. the device state module 840 ensures that important device data is stored in persistent memory, such as the flash memory 808, so that the data is not lost when the mobile device 10 is turned off or loses power. A PIM 842 includes functionality for organizing and managing data items of interest to the user, such as, but not limited to, e-mail, contacts, calendar events, and voice mails, and may interact with the wireless network 12'.

Other types of software applications or components 839 can also be installed on the mobile device 10. These software applications 839 can be pre-installed applications (i.e. other than message application 838) or third party applications, which are added after the manufacture of the mobile device 10. Examples of third party applications include games, calculators, utilities, etc.

The additional applications 839 can be loaded onto the mobile device 10 through at least one of the wireless network 16', the auxiliary I/O subsystem 812, the data port 814, the short-range communications subsystem 822, or any other suitable device subsystem 824.

The data port 814 can be any suitable port that enables data communication between the mobile device 10 and another computing device. The data port 814 can be a serial or a parallel port. In some instances, the data port 814 can be a Universal Serial Bus (USB) port that includes data lines for data transfer and a supply line that can provide a charging current to charge the battery 830 of the mobile device 10.

For voice communications, received signals are output to the speaker 818, and signals for transmission are generated by the microphone 820. Although voice or audio signal output is accomplished primarily through the speaker 818, the display 48 can also be used to provide additional information such as the identity of a calling party, duration of a voice call, or other voice call related information.

The touch-sensitive display 860 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 860 is a capacitive touch-sensitive display which includes a capacitive touch-sensitive overlay 864. The overlay 864 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 48 of the touch-sensitive display 860 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 860. The processor 802 may determine attributes of the touch, including a location of a touch. Touch location data may include an area of contact or a single point of contact, such as a point at or near a center of the area of contact, known as the centroid. A signal is provided to the controller 866 in response to detection of a touch. A touch may be detected from any suitable object, such as a finger, thumb, appendage, or other items, for example, a stylus, pen, or other pointer, depending on the nature of the touch-sensitive display 860. The location of the touch moves as the detected object moves during a touch. One or both of the controller 866 and the processor 802 may detect a touch by any suitable contact member on the touch-sensitive display 860. Similarly, multiple simultaneous touches, are detected.

In some examples, an optional force sensor 870 or force sensors is disposed in any suitable location, for example, between the touch-sensitive display 860 and a back of the mobile device 10 to detect a force imparted by a touch on the touch-sensitive display 860. The force sensor 870 may be a force-sensitive resistor, strain gauge, piezoelectric or piezoresistive device, pressure sensor, or other suitable device.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, messaging infrastructure 18, policy authority 20, enterprise server 32, corporate servers 36, computing devices 38, IM system 700, etc.; any component of or related thereto, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of operating an electronic device, the method comprising:
   determining that a messaging security policy for the electronic device has been downgraded to a lower security level;
   removing protected content from an instant messaging application on the electronic device that is subjected to the security policy; and
   displaying at least one notification of the policy downgrade in a conversation list entry in an instant messaging user interface.

2. The method of claim 1, wherein removing protected content comprises removing access to at least one protected instant messaging group.

3. The method of claim 2, further comprising automatically removing the electronic device from at least one instant messaging group membership.

4. The method of claim 1, wherein removing protected content comprises removing at least one multi-participant instant messaging conversation.

5. The method of claim 1, wherein removing protected content comprises removing at least a portion of protected content from within a one-to-one conversation with an instant messaging contact.

6. The method of claim 5, further comprising maintaining the instant messaging contact.

7. The method of claim 5, further comprising maintaining the one-to-one conversation and updating the one-to-one conversation to indicate that the one-to-one conversation is no longer protected.

8. The method of claim 1, further comprising receiving a policy downgrade instruction from a policy authority, and notifying a messaging infrastructure of the downgrade to enable the messaging infrastructure to notify at least one contact, at least one group, or both to be notified of the downgrade.

9. The method of claim 1, further comprising deleting cryptographic keys used under the policy being downgraded.

10. The method of claim 1, further comprising sending a request to keep protected content to at least one contact, at least one group, or both.

11. The method of claim 10, further comprising enabling selection of at least one protected content item.

12. An electronic device comprising a processor, memory, and a display, the memory comprising computer executable instructions for:
    determining that a messaging security policy for the electronic device has been downgraded to a lower security level;
    removing protected content from an instant messaging application on the electronic device that is subjected to the security policy; and
displaying at least one notification of the policy downgrade in a conversation list entry in an instant messaging user interface.

13. A non-transitory computer readable storage medium comprising computer executable instructions for operating an electronic device, the computer executable instructions comprising instructions for:
    determining that a messaging security policy for the electronic device has been downgraded to a lower security level;
    removing protected content from an instant messaging application on the electronic device that is subjected to the security policy; and
displaying at least one notification of the policy downgrade in a conversation list entry in an instant messaging user interface.

14. The non-transitory computer readable storage medium of claim 13, wherein removing protected content comprises removing access to at least one protected instant messaging group.

15. The non-transitory computer readable storage medium of claim 13, wherein removing protected content comprises removing at least one multi-participant instant messaging conversation.

16. The non-transitory computer readable storage medium of claim 13, wherein removing protected content comprises removing at least a portion of protected content from within a one-to-one conversation with an instant messaging contact.

17. The non-transitory computer readable storage medium of claim 13, further comprising instructions for receiving a policy downgrade instruction from a policy authority, and notifying a messaging infrastructure of the downgrade to enable the messaging infrastructure to notify at least one contact, at least one group, or both to be notified of the downgrade.

18. The non-transitory computer readable storage medium of claim 13, further comprising instructions for deleting cryptographic keys used under the policy being downgraded.

* * * * *